United States Patent
Plummer

(10) Patent No.: US 8,302,936 B2
(45) Date of Patent: Nov. 6, 2012

(54) ANTI-FOULING DEVICE HAVING A CAPSTAN WITH A NON-DRIVEN SLOPED BODY

(75) Inventor: Jeffrey J. Plummer, Rockford, IL (US)

(73) Assignee: Greenlee Textron Inc., Rockford, IL (US)

( * ) Notice: Subject to any disclaimer, the term of this patent is extended or adjusted under 35 U.S.C. 154(b) by 1154 days.

(21) Appl. No.: 12/170,065

(22) Filed: Jul. 9, 2008

(65) Prior Publication Data

US 2009/0039193 A1 Feb. 12, 2009

Related U.S. Application Data

(60) Provisional application No. 60/954,629, filed on Aug. 8, 2007.

(51) Int. Cl.
*H02G 1/08* (2006.01)

(52) U.S. Cl. ........ 254/134.3 FT; 254/134.3 R; 254/371; 254/411; 254/403; 254/383

(58) Field of Classification Search ................ 254/371, 254/372, 383, 278, 374, 373, 134.3 FT, 134.4 R, 254/403, 411
See application file for complete search history.

(56) References Cited

U.S. PATENT DOCUMENTS

| | | | |
|---|---|---|---|
| 4,555,093 A * | 11/1985 | Plummer | 254/362 |
| 4,819,912 A | 4/1989 | Plummer | |
| 5,645,265 A * | 7/1997 | Shu | 254/134.3 FT |
| 6,073,917 A | 6/2000 | Plummer | |
| 6,431,524 B1 * | 8/2002 | Weber | 254/134.3 FT |
| 6,517,052 B1 * | 2/2003 | Lake | 254/134.3 PA |
| 6,540,207 B1 * | 4/2003 | Barnes | 254/134.3 R |
| 7,070,168 B2 * | 7/2006 | Plummer | 254/134.3 FT |
| 7,384,023 B2 * | 6/2008 | Plummer | 254/223 |
| 7,832,709 B2 * | 11/2010 | O'Connor | 254/134.3 R |
| 2007/0221896 A1 * | 9/2007 | Jordan et al. | 254/134.3 FT |
| 2009/0039193 A1 * | 2/2009 | Plummer | 242/407 |
| 2009/0078921 A1 * | 3/2009 | Plummer | 254/134.3 FT |

* cited by examiner

*Primary Examiner* — Lee D Wilson
(74) *Attorney, Agent, or Firm* — Clark Hill PLC

(57) ABSTRACT

A cable puller assembly includes a housing assembly, a motor assembly and an anti-fouling device. The motor assembly is secured to the housing assembly and has an output shaft extending outwardly therefrom. The output shaft is rotated about an axis of rotation by the motor assembly. The anti-fouling device has a capstan and a body. The output shaft is operatively associated with the capstan in order to rotate the capstan about the axis of rotation. The body is positioned around an end portion of the capstan proximate to the housing assembly. The body defines a sloped surface that biases incoming rope that wraps around the sloped surface down onto the capstan.

24 Claims, 26 Drawing Sheets

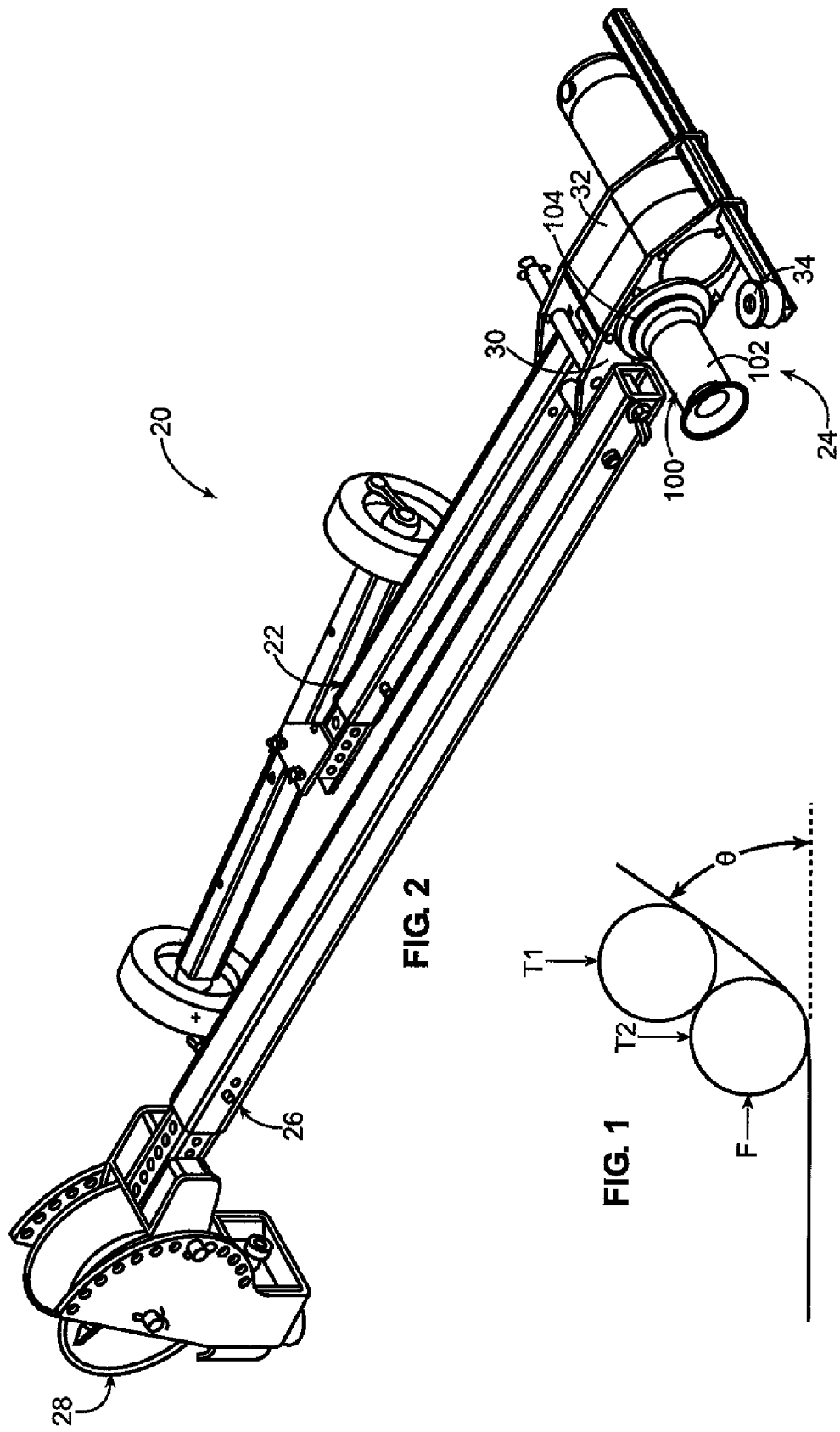

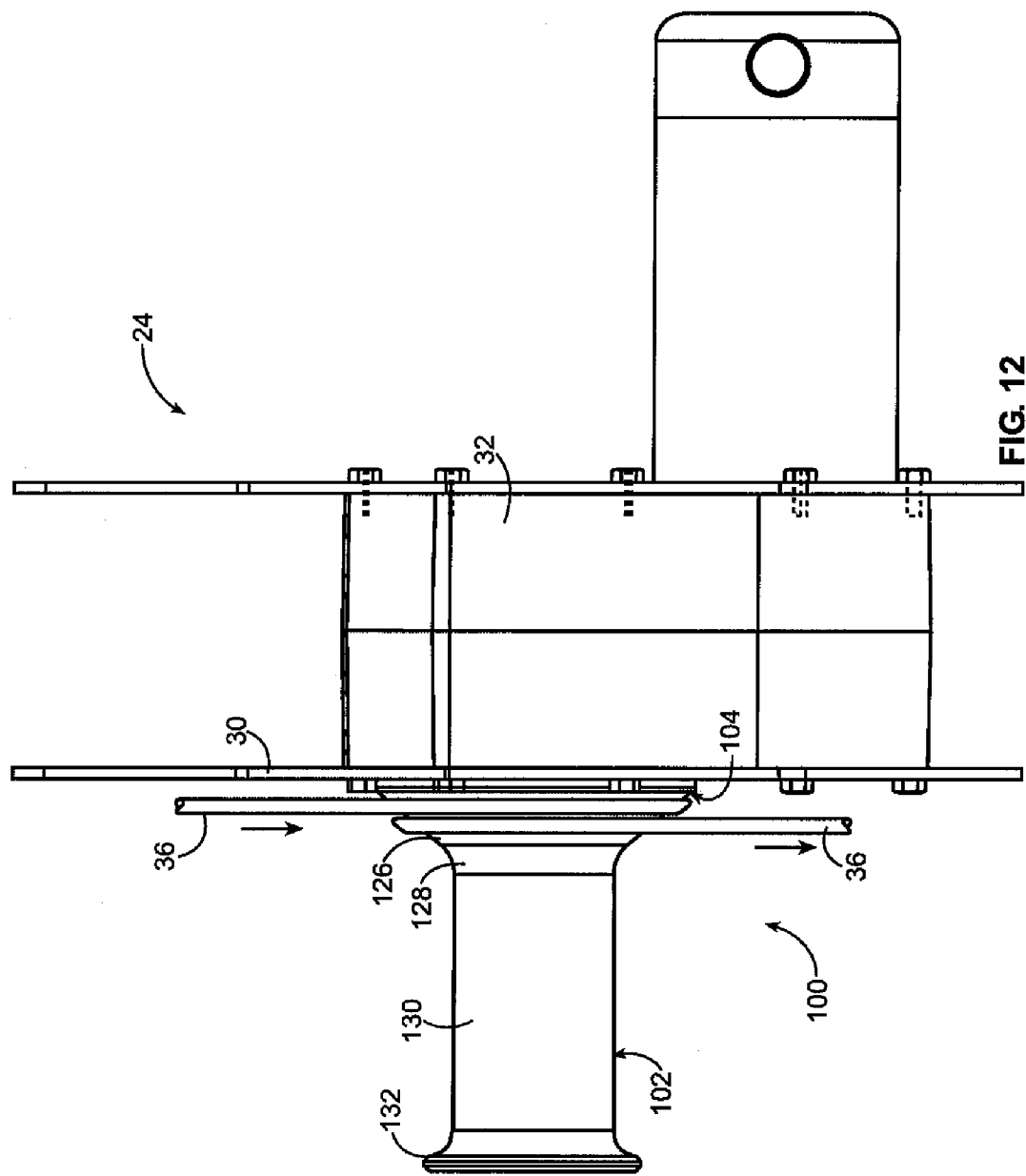

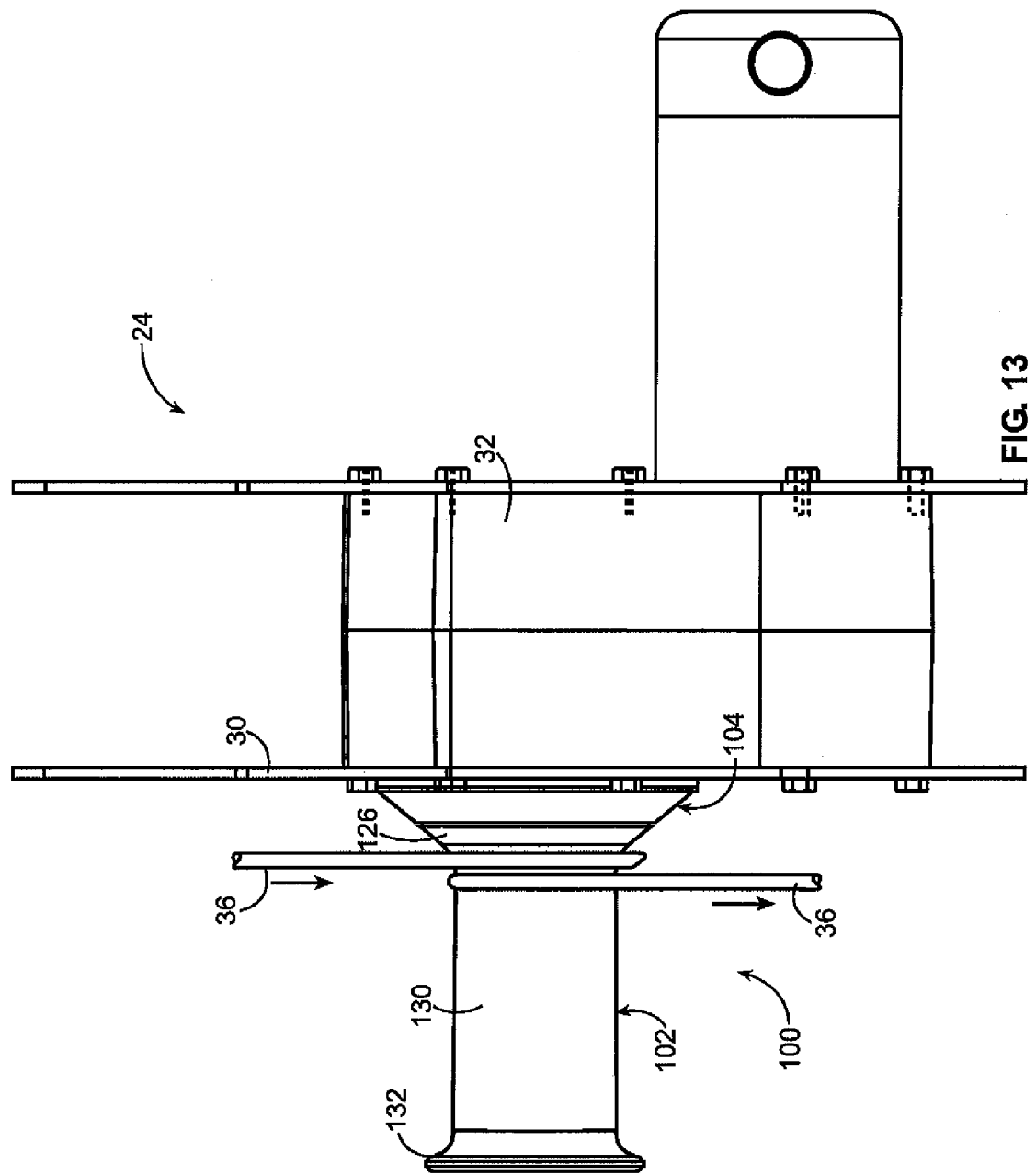

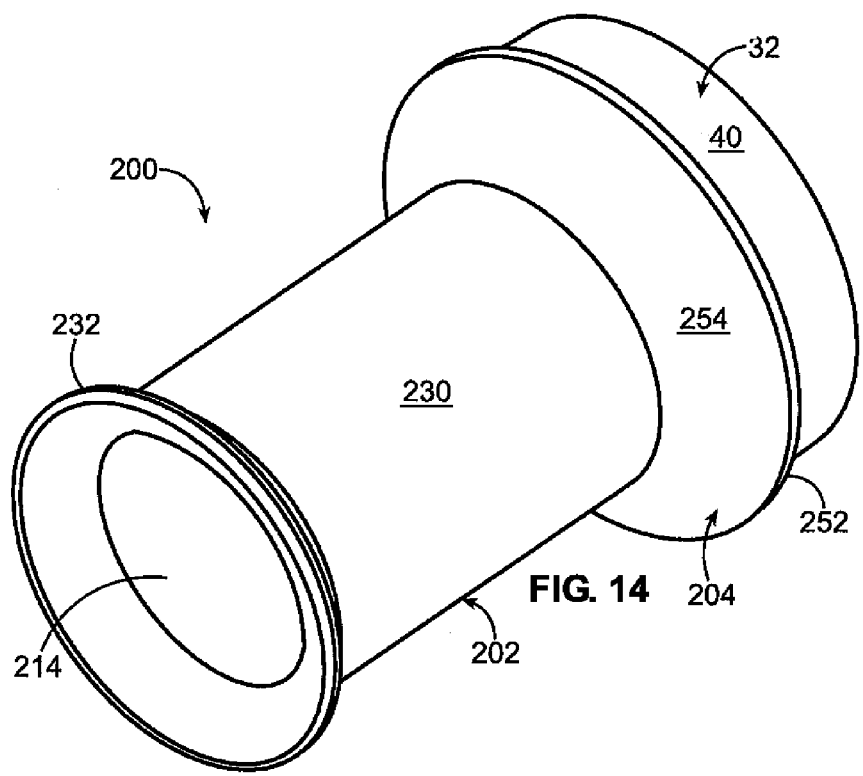
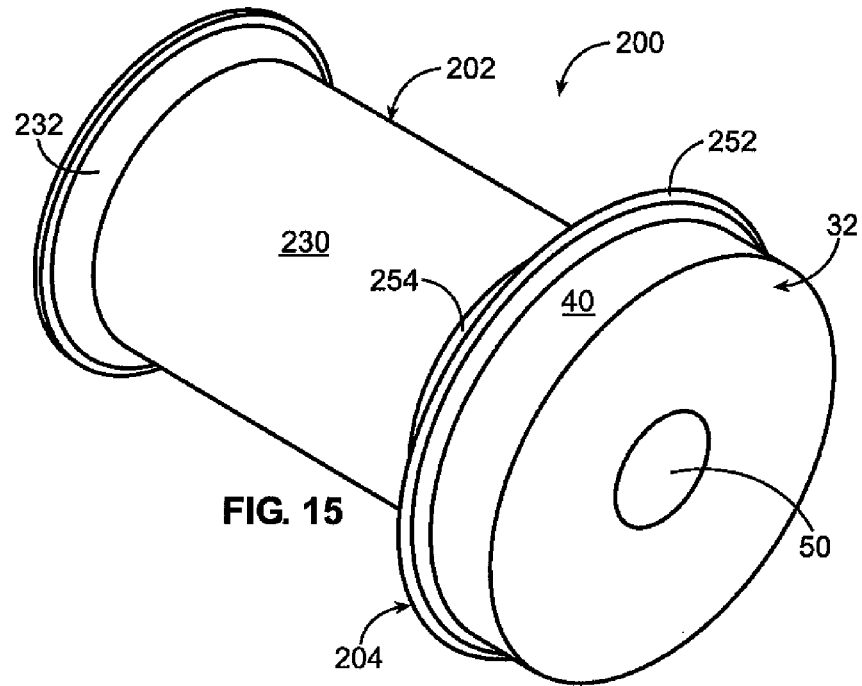

ANTI-FOULING DEVICE HAVING A CAPSTAN WITH A NON-DRIVEN SLOPED BODY

CROSS-REFERENCE AND INCORPORATION BY REFERENCE

This application claims the domestic priority of U.S. Provisional Application Ser. No. 60/954,629, filed on Aug. 8, 2007, and entitled "Capstan With Non-Driven Inside Flange". U.S. Provisional Application Ser. No. 60/954,629 is hereby incorporated by reference in its entirety.

FIELD OF THE INVENTION

The invention generally relates to cable pullers. More particularly, the invention relates to cable pullers having anti-fouling devices.

BACKGROUND OF THE INVENTION

Cable pulling is a commonly used technique whereby a pulling rope is attached to a cable or wire that is to be pulled through conduit. The pulling rope is then wound by a user around a capstan, which acts as a frictional force multiplier, and that is powered by a motor. This arrangement allows the user to exert a small force on the rope that tails off of the capstan and which is then translated into a large force, typically of several thousand pounds, which is exerted on the incoming pulling rope, providing enough force on the pulling rope and the cable to pull them through the conduit.

A frequent problem that occurs when pulling cable is that the pulling rope will begin to wrap upon itself on the capstan, which creates a condition called rope overlap or fouling, unless the user relaxes the force exerted on the rope as it tails off of the capstan. Once rope overlap or fouling occurs, the rope will cease to tail off the capstan, eliminating any further progress of the cable pull, forcing the user to approach the capstan and the pulling rope which is undesirable. Hence, there has been a need for devices and methods that facilitate the fleeting or lateral movement of the rope as it winds onto the capstan to prevent rope overlap.

U.S. Pat. No. 4,819,912 discloses one such device that accomplishes this task and its content is incorporated herein by reference in its entirety. It shows a capstan with a helical ramp and a guide arm to properly guide the wire onto the capstan and provide the necessary lateral force to insure proper fleeting of the rope, preventing rope overlap. The drawback to this design is that the geometry of the capstan is complex and an extra part in the form of an arm is needed, which increases the cost of the cable puller. Furthermore, the helical ramp reduces the land length available on the capstan for receiving the pulling rope, forcing the capstan to be longer or limiting the amount of pulling rope that can be wound onto the capstan. Also, the increased force that is created by using the ramp results in friction that reduces drive train efficiency. Finally, the force exerted on the guide arm can cause it to become loose, thereby allowing it to rotate with the capstan, which will force the user to stop the cable pull to fix the situation.

U.S. Pat. No. 6,073,917, whose content is also incorporated herein by reference in its entirety, also uses a helical ramp but allows the user to adjust its position on the capstan to allow for different angles at which the pulling rope can be wrapped onto the capstan. This technique also suffers from the same problems as the '912 patent, including increased cost, increased length of the capstan, and the reduction of drive train efficiency. It also requires the user to take the extra step of positioning the ramp properly which can be time consuming and adds another opportunity for operator error.

Other devices for improved fleeting of rope onto a capstan use rollers that are distanced away from the capstan, which creates more friction and drag when trying to pull cable. Some cable pullers do not have a separate mechanism for preventing rope overlap, but use a capstan with an inside sloped body having an angle of forty-five degrees, which provides the ideal mathematical angle for maximizing the outward and axial thrust on the previous wraps of rope to move them laterally on the capstan as the rope continues to wrap onto the capstan. The transfer function below, along with FIG. 1, shows exactly how this calculation is performed and why the ideal angle is forty-five degrees.

$$F = T1*((1-\mu^2)*\sin(2\Theta))/2-\mu) - T2*\mu$$

Where:
F=Lateral force pushing rope outward
T1=Force normal to the capstan from first wrap of rope
T2=Force normal to the capstan from second wrap of rope
$\mu$=Coefficient of friction
$\Theta$=Angle of inside capstan sloped body
F=function (Sin 2$\Theta$)
F is max at $dF/d\Theta=0$
$df/d\Theta = \cos 2\Theta$
Therefore F is max @$\Theta=45°$ Each additional wrap of rope that winds onto the sloped body increases the force acting to push the rope outward on the capstan but if the rate of pulling the rope becomes too high or if too much force is exerted on the tail end, the rope will begin to climb up the sloped body. Consequently, this technique requires the user to pay attention to ensure that the rope does not climb to the top of the sloped body which will cause the rope to fall back over the topmost wrapping of rope and create an overlap condition.

For all of the above reasons, there still exists a need for an antifouling device or a rope overlap prevention device that is less costly, easier to manufacture, that does not increase friction or drag when pulling rope, and that requires less effort by a user when being used than previous antifouling devices. This is particularly true for cable pullers as the forces exerted on the cable or rope can range in the thousands of pounds and it is undesirable for the user to worry about rope overlap.

SUMMARY OF THE INVENTION

The present invention provides a cable puller assembly having a housing assembly, a motor assembly and an anti-fouling device. The motor assembly is secured to the housing assembly and has an output shaft extending outwardly therefrom. The output shaft is configured to be rotated about an axis of rotation by the motor assembly. The anti-fouling device has a capstan and a body. The output shaft is configured to be operatively associated with the capstan in order to rotate the capstan about the axis of rotation. The body is positioned around an end portion of the capstan proximate to the housing assembly. The body defines a sloped surface that biases incoming rope that wraps around the sloped surface down onto the capstan.

BRIEF DESCRIPTION OF THE DRAWINGS

The features of the invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which:

FIG. 1 illustrates the forces involved in deriving the ideal sloped surface angle for a capstan to minimize the risk of rope fouling;

FIG. 2 is a perspective view of a cable puller including a first embodiment of an anti-fouling device which incorporates the features of the invention;

FIGS. 12 and 13 are top plan views of the puller assembly of FIG. 3 illustrating the pulling of a rope using the first embodiment of the anti-fouling device; in FIG. 12 the rope is wrapped around the non-driven sloped body, and in FIG. 13 the rope has moved off of the non-driven sloped body to the body of the capstan;

FIG. 14 is a perspective view of a second embodiment of the anti-fouling device which incorporates the features of the invention;

FIG. 15 is an alternative perspective view of the anti-fouling device shown in FIG. 14;

DETAILED DESCRIPTION OF THE ILLUSTRATED EMBODIMENTS

Figure 3:
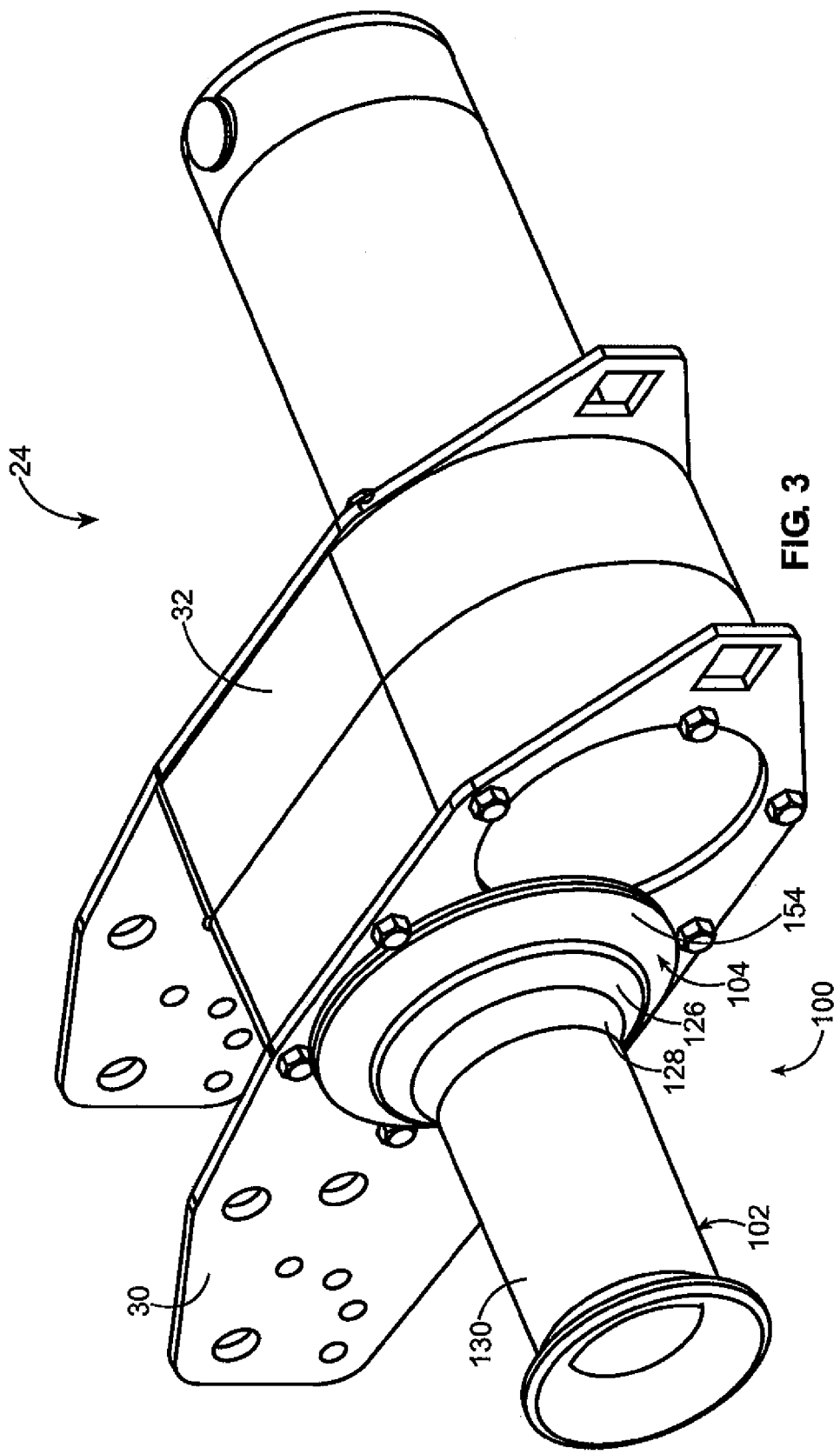
FIG. 3 is a perspective view of a puller assembly including the first embodiment of the anti-fouling device.
Figure 4:
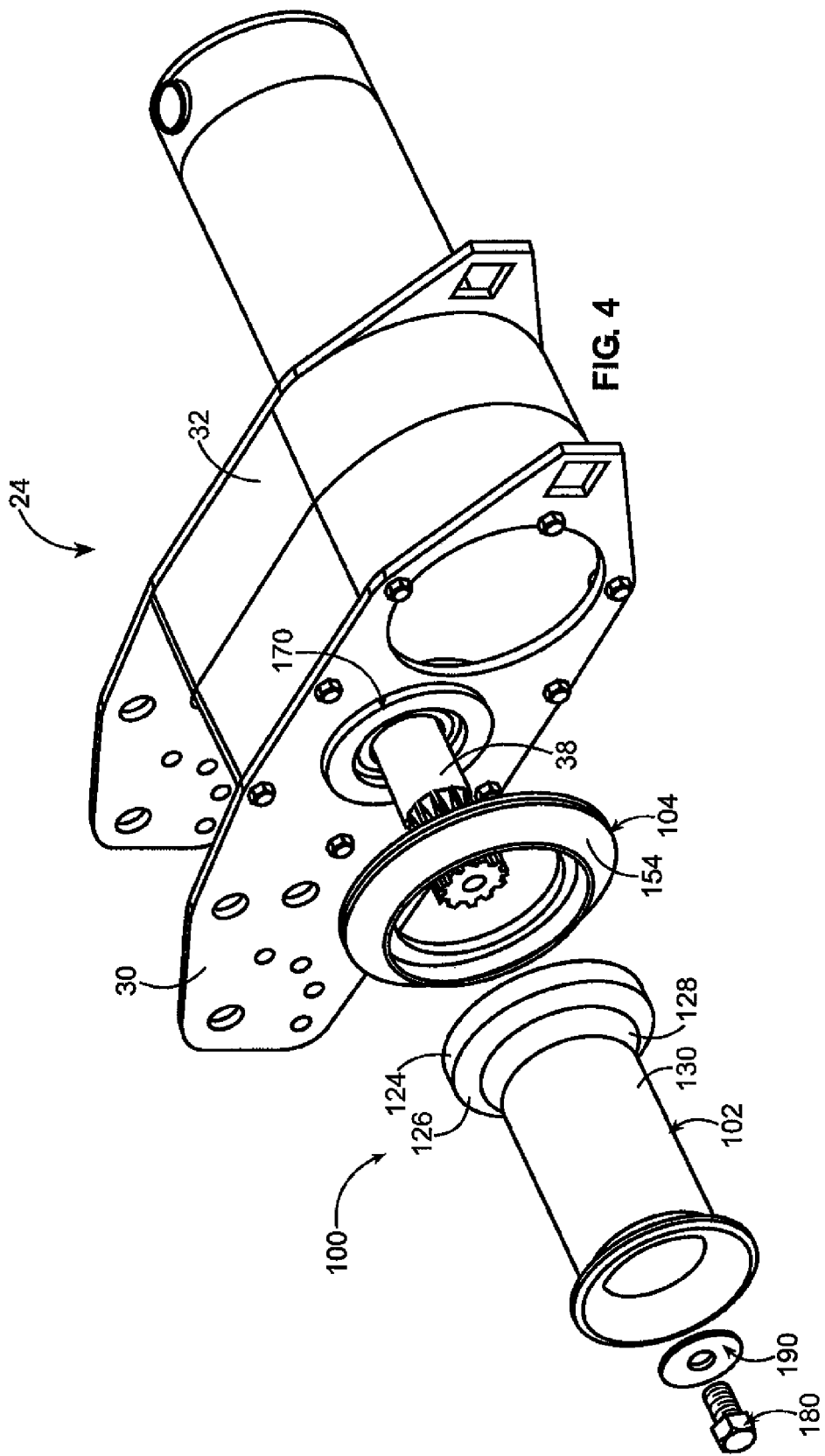
FIG. 4 is a partial exploded perspective view of the puller assembly of FIG. 3.

While this invention may be susceptible to embodiment in different forms, there is shown in the drawings and will be described herein in detail, specific embodiments with the understanding that the present disclosure is to be considered an exemplification of the principles of the invention, and is not intended to limit the invention to that as illustrated.

Attention is invited to the various embodiments of an anti-fouling device 100, 200, 300 that is less costly, easier to manufacture, that does not increase friction or drag when pulling rope, and that requires less effort by a user when being used than previous antifouling devices. A first embodiment of an antifouling device 100 is described herein and illustrated in FIGS. 2-13. A second embodiment of an antifouling device 200 is described herein and illustrated in FIGS. 14-26. A third embodiment of an antifouling device 300 is described herein and illustrated in FIGS. 24, 27-39. Like elements are denoted with like reference numerals with the first embodiment being in the one hundreds, the second embodiment being in the two hundreds, and the third embodiment being in the three hundreds. It is to be understood that the drawings are not necessarily drawn to scale.

Each of the antifouling devices 100, 200, 300 is configured to be formed as a part of a cable puller 20, such as the cable puller 20 illustrated in FIG. 2 (showing antifouling device 100 formed as a part thereof). The cable puller 20 may be any type of cable puller. As illustrated in FIG. 2, the cable puller 20 generally includes a base 22, a puller assembly 24, a telescoping boom 26 extending from the puller assembly 24, and a conduit attachment system 28.

The puller assembly 24 typically includes a frame or housing 30, a motor/gearbox 32, a roller 34, and the antifouling device 100, 200, 300. The puller assembly 24 allows for adjustment of the angle between the base 22 and the telescoping boom 26. The roller 34 guides a pulling rope 36.

Attention is invited to FIGS. 2-13 and the first embodiment of the antifouling device 100. The antifouling device 100 includes a capstan 102 and a non-driven sloped body 104.

Figure 5:
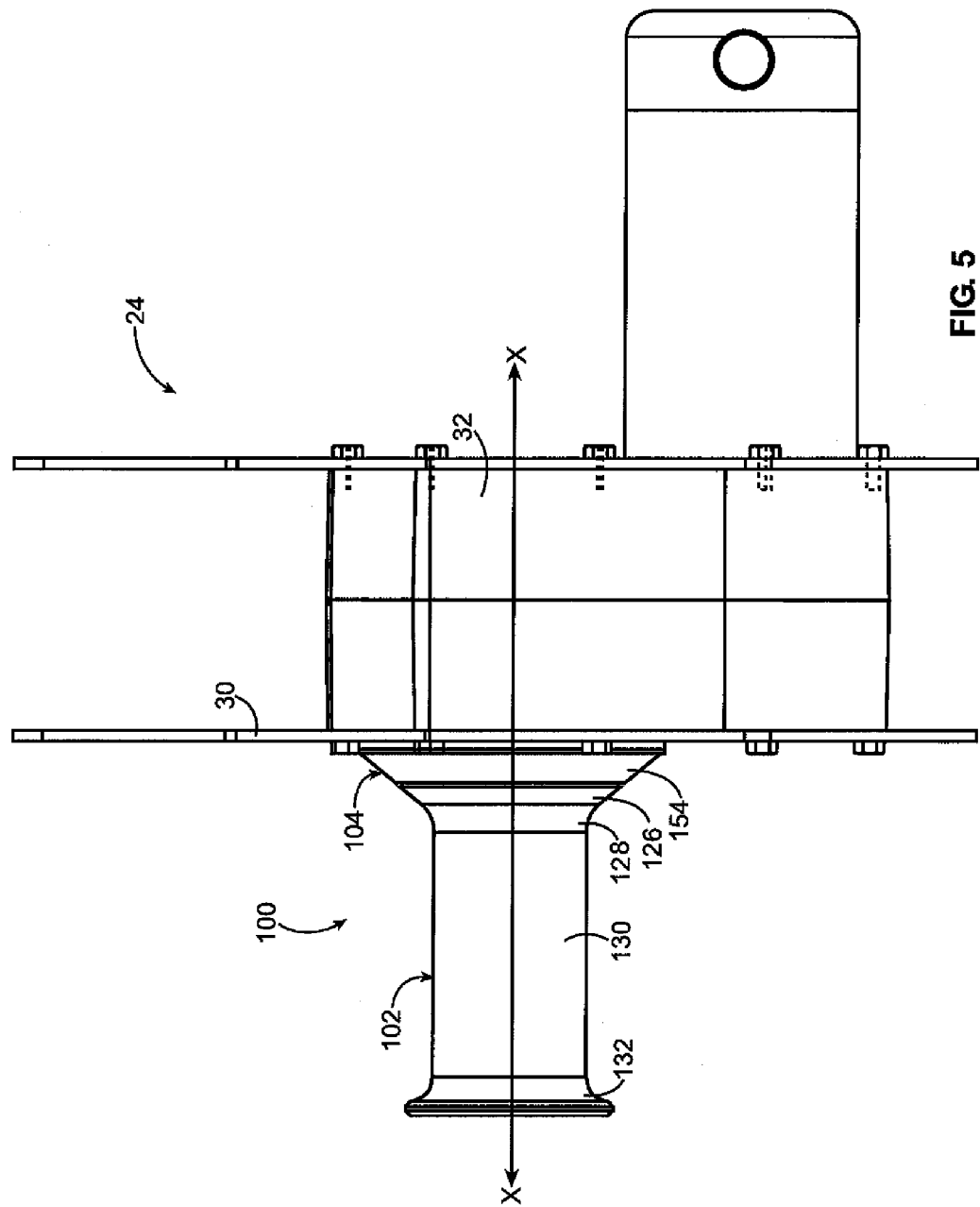
FIG. 5 is a top plan view of the puller assembly of FIG. 3.

As shown in FIGS. 2-9, 12 and 13, the capstan 102 has first and second ends 106, 108 and inner and outer surfaces 110, 112 such that a passageway 114, which defines the inner surface 110 of the capstan 102, extends through the capstan 102 from the first end 106 to the second end 108. The capstan 102 preferably is rotatable about an axis of rotation X-X, as shown in FIG. 5. The inner surface 110 defines a shoulder 116 between the first and second ends 106, 108 such that the passageway 114 has a reduced diameter portion 118 provided between the first end 106 and the shoulder 116. The inner surface 110 at the reduced diameter portion 118 is configured/shaped to retain at least a portion of an output shaft 38 of the motor/gearbox 32 that is received in the reduced diameter portion 118 of the passageway 114.

Figure 6:
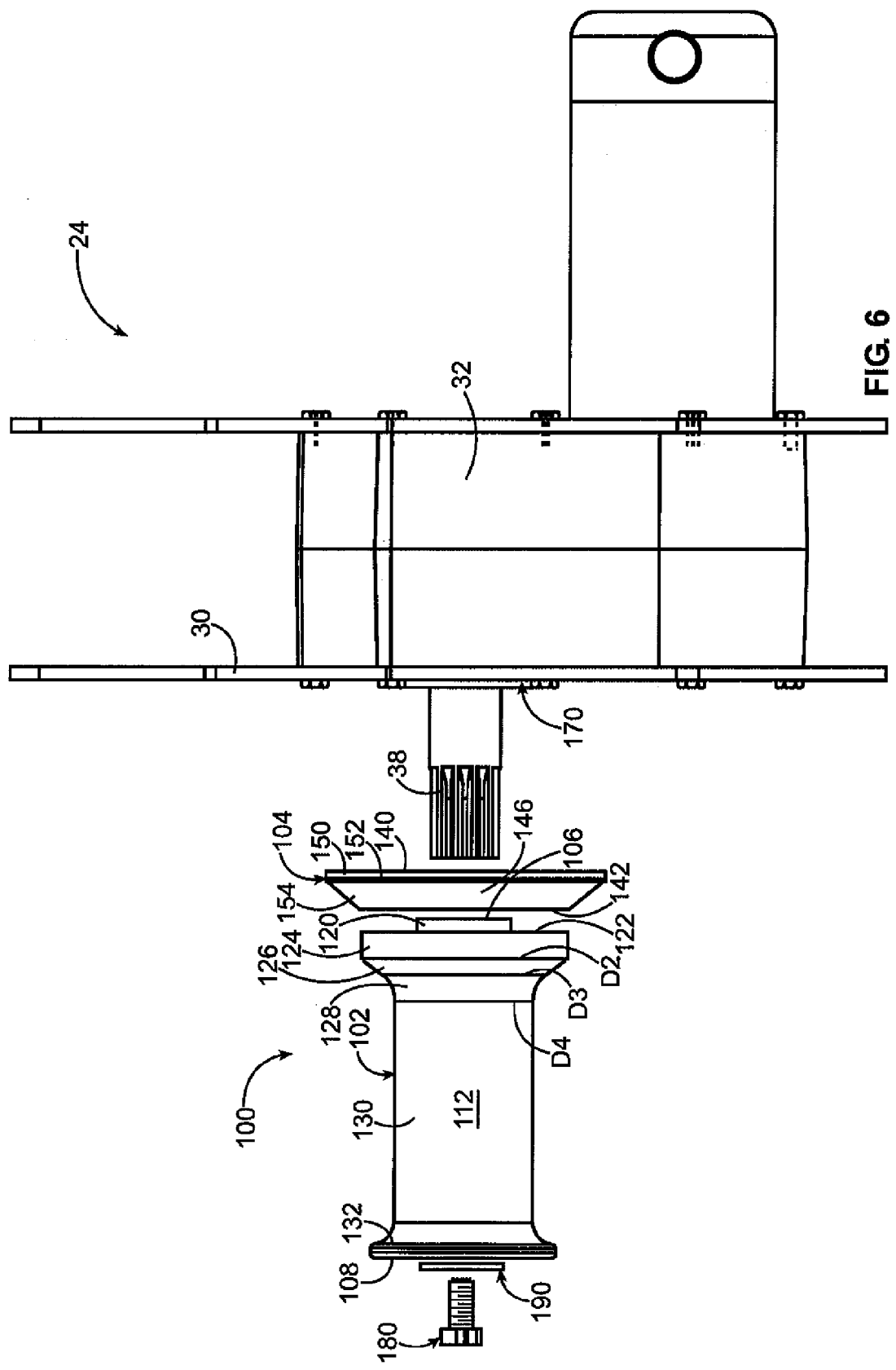
FIG. 6 is a partial exploded top plan view of the puller assembly of FIG. 3.
Figure 8:
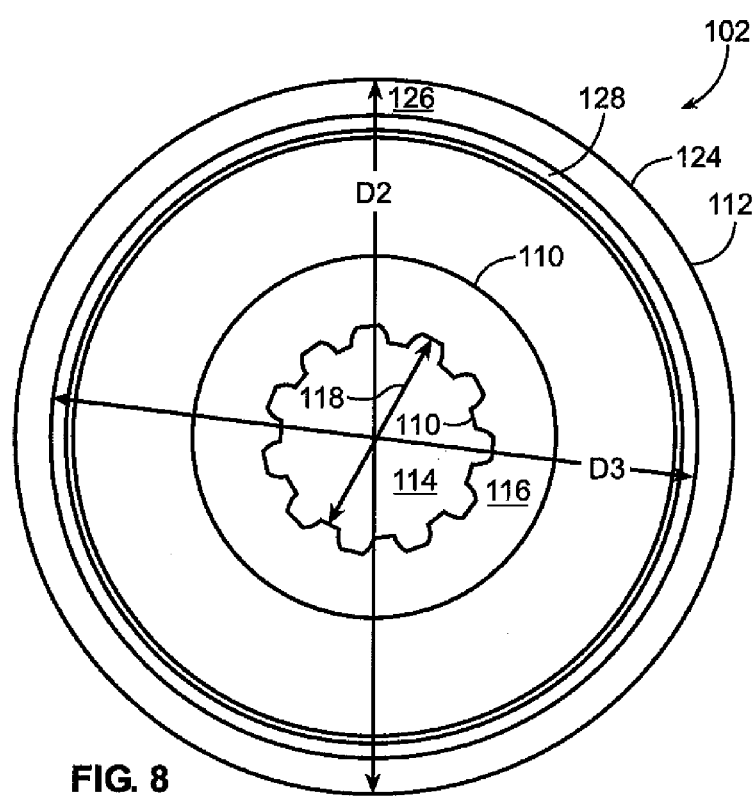
FIG. 8 is a front view of a capstan of the first embodiment of the anti-fouling device.
Figure 9:
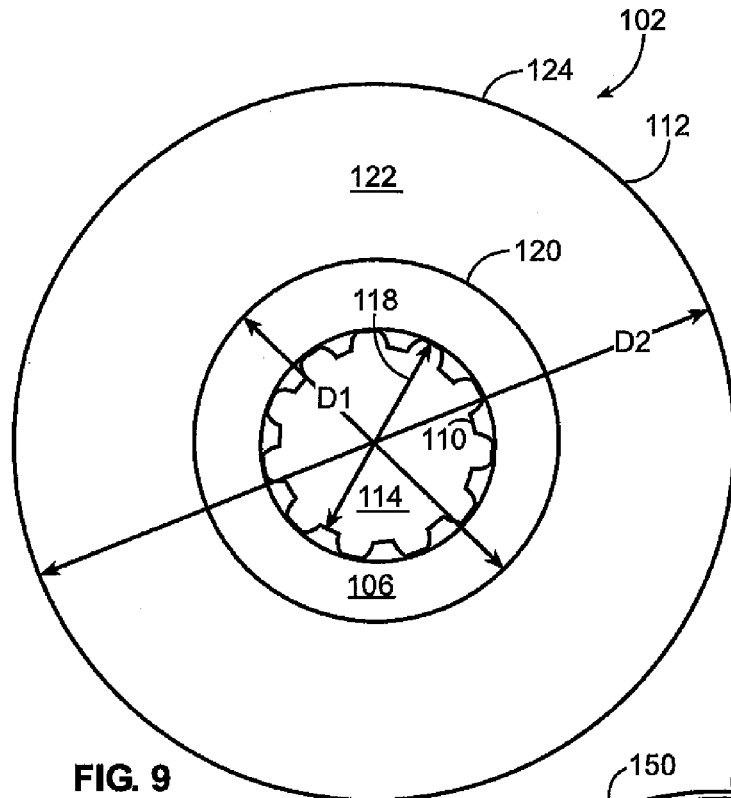
FIG. 9 is a rear view of the capstan of FIG. 8.

As shown in FIG. 6, the outer surface 112 of the capstan 102 has a first constant diameter portion 120 that extends from the first end 106 to a shoulder 122 of the capstan 102. The first constant diameter portion 120 has an outer diameter D1, see FIG. 9, about the outer surface 112 thereof. As shown in FIG. 6, the capstan 102 has a second constant diameter portion 124 that extends from the shoulder 122 to a tapered portion 126. The second constant diameter portion 124 has an outer diameter D2, see FIG. 9, about the outer surface 112 thereof. Outer diameter D2 is larger than outer diameter D1. As shown in FIG. 6, the tapered portion 126 tapers outwardly from the second constant diameter portion 124 to a first curved portion 128. An outer diameter D3, see FIG. 8, is defined about the outer surface 112 at the connection of the portions 126, 128. Outer diameter D3 is preferably smaller than the outer diameter D2, but is preferably larger than outer diameter D1. The tapered portion 126 is preferably angled between the portions 124, 128 at an angle of approximately between thirty-five and fifty-five degrees relative to the axis of rotation X-X, and in a most preferred embodiment the tapered portion 126 is preferably angled between the portions 124, 128 at an angle of approximately forty degrees relative to the axis of rotation X-X. It is to be understood that the tapered portion 126 could be angled at any other suitable angle as desired.

As shown in FIG. 6, the first curved portion 128 curves outwardly, preferably in a concave manner, from the tapered portion 126 to a third constant diameter portion 130 of the capstan 102. The third constant diameter portion 130 has an outer diameter D4, see FIG. 6, about the outer surface 112. Outer diameter D4 is preferably smaller than the outer diameter D3, but is preferably larger than outer diameter D1. As shown in FIG. 6, the third constant diameter portion 130 extends outwardly from the first curved portion 128 to an end portion 132 which, in turn, extends to the second end 108 of the capstan 102. The end portion 132 can be configured in any desired manner, although it typically will be tapered/curved as best illustrated in FIGS. 3-7.

Figure 10:
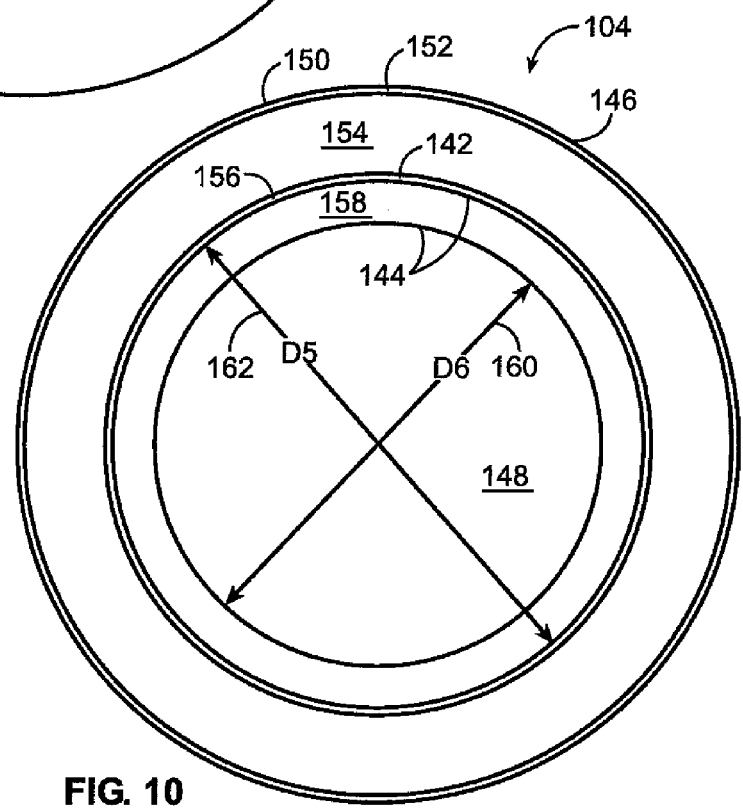
FIG. 10 is a front view of a non-driven sloped body of the first embodiment of the anti-fouling device.
Figure 11:
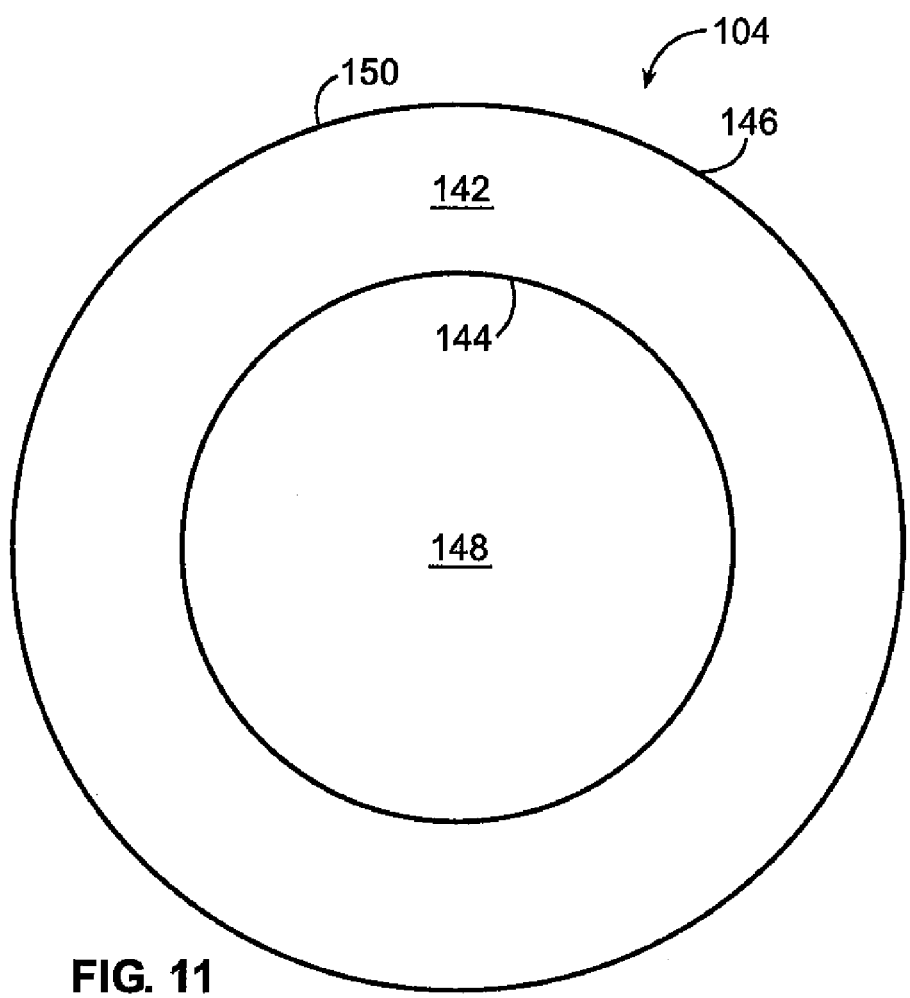
FIG. 11 is a rear view of the non-driven sloped body of FIG. 10.

AS shown in FIGS. 6, 10 and 11, the non-driven sloped body 104 has first and second ends 140, 142 and inner and outer surfaces 144, 146 such that a passageway 148, defining the inner surface 144, extends through the non-driven sloped body 104 from the first end 140 to the second end 142. The non-driven sloped body 104 preferably is rotatable about the same axis of rotation X-X as is the capstan 102. The outer surface 146 has a first constant diameter portion 150 that extends outwardly from the first end 140 to a tapered or curved portion 152. The tapered or curved portion 152 extends outwardly from the first constant diameter portion 150 to a tapered portion 154. The tapered portion 154 extends angularly outwardly from the tapered or curved portion 152 to the second end 142. The tapered portion 154 is preferably angled between the tapered or curved portion 152 and the second end 142 at an angle of approximately between thirty-five and fifty-five degrees relative to the axis of rotation X-X, and in a most preferred embodiment the tapered portion 154 is preferably angled between the tapered or curved portion 152 and the second end 142 at an angle of approximately forty degrees relative to the axis of rotation X-X. It is to be understood that the tapered portion 154 could be angled at any other suitable angle as desired, although it is preferred that the tapered portion 154 is angled at the same angle as the tapered portion 126 of the capstan 102.

A ring-shaped wall 156 extends inwardly from the tapered portion 154 at the second end 142 to the inner surface 144 defined by the passageway 148. The inner surface 144 defines a shoulder 158 between the first and second ends 140, 142 that separates the passageway 148 into first and second portions 160, 162. The shoulder 158 is preferably parallel to the ring-shaped wall 156. The second portion 162 of the passageway 148, defined between the second end 142 and the shoulder 158, has a diameter D5, see FIG. 10, which is slightly larger than the outer diameter D2 of the capstan 102. The first portion 160 of the passageway 148, defined between the first end 140 and the shoulder 158, has a diameter D6, see FIG. 10, which is less than the diameter D5.

As shown in FIG. 6, the motor/gearbox 32 has the output shaft 38 which extends out of the frame 30. A circular pilot ring 170 is preferably provided that is secured to the frame 30 around the output shaft 38. The circular pilot ring 170 preferably has an outer diameter that is slightly smaller than the diameter D6 of the passageway 148. The non-driven sloped body 104 is positioned such that the circular pilot ring 170 is provided within the first portion 160 of the passageway 148. The non-driven sloped body 104 is configured to be able to rotate about the circular pilot ring 170.

Figure 7:
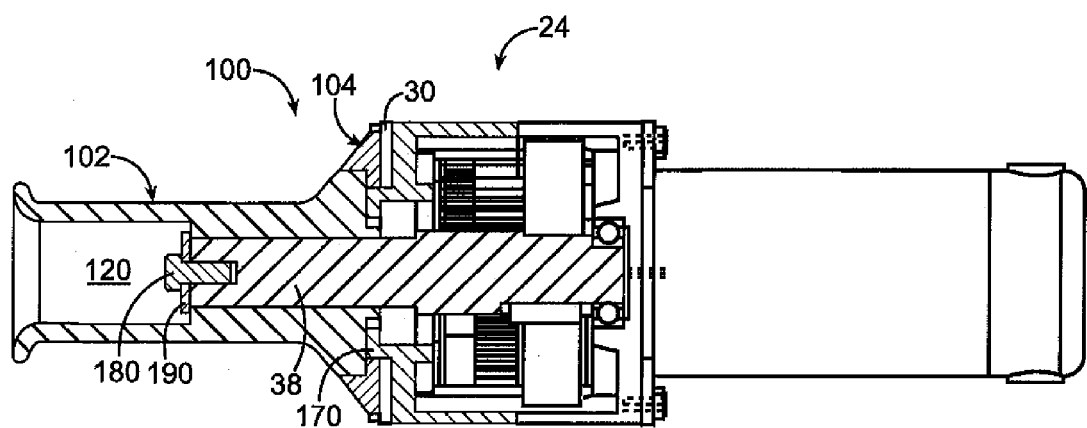
FIG. 7 is a partial cross-sectional view of the puller assembly of FIG. 3.

The capstan 102 is positioned such that the output shaft 38 enters the reduced diameter portion 118 of the passageway 114 from the first end 106. The first end 106 of the capstan 102 enters the passageway 148 at the second end 142 of the non-driven sloped body 104 with the first end 106 of the capstan 102 being in abutting relationship within the shoulder 158. As the outer diameter D2 of the capstan 102 is slightly smaller than the diameter D5 of the passageway 148, the capstan 102 rotates within the passageway 148 of the non-driven sloped body 104 without causing rotation of the non-driven sloped body 104. The capstan 102 is securely mounted to the output shaft 38, preferably by a fastener 180 and a washer 190, which is in abutting relationship with the shoulder 116, as illustrated in FIG. 7, although it is to be understood that the capstan 102 could be securedly mounted to the output shaft 38 by any other suitable manner. The configurations/shapes of the inner surface 110 in the reduced diameter portion 118 of the passageway 114 and the output shaft 38 also preferably prevent the output shaft 38 from rotating independently of the capstan 102.

With the capstan 102 secured in place, the capstan 102 prevents outward movement of the non-driven sloped body 104, and the circular pilot ring 170 and/or the frame 30 prevents inward movement of the non-driven sloped body 104, thus securing the non-driven sloped body 104 in place. The tapered portion 154 of the non-driven sloped body 104 acts as an extension of the tapered portion 126 of the capstan 102 creating a sloped surface that is split between the capstan 102 and the non-driven sloped body 104. As explained hereinabove, the tapered portions 126, 154 are preferably angled at the same angle, and that angle is most preferably forty degrees relative to the axis of rotation X-X. Forty degrees is the most preferred angle because it is close to the optimal angle for fleeting rope of forty-five degrees, but limits how far the capstan 102 protrudes from the frame 30 of the cable puller 20, thereby reducing the risk of damage that could be caused by bumping the capstan 102 while transporting the cable puller 20.

In operation, as the rope 36 (illustrated in FIGS. 12 and 13, although it is to be understood that the size/thickness of the rope 36 may preferably be less than that as illustrated relative to the capstan 102 and the non-driven sloped body 104) begins to wrap onto the capstan 102, any wraps of rope 36 that contact the tapered portion 154 of the non-driven sloped body 104 (see generally FIG. 12—for illustrative purposes, only a single wrap of rope 36 is illustrated, although it should be understood that more wraps of rope 36 may be in contact with the tapered portion 154) continue to increase the force that pushes the wraps of rope 36 laterally onto the portions 126, 128, 130 (or the body) of the capstan 102, but do not increase the tractive frictional force on the capstan 102 that tends to prevent the fleeting of the rope 36.

As the number of wraps of rope 36 on the tapered portion 154 of the non-driven sloped body 104 increases as compared to the number of wraps on the body 126, 128, 130 of the capstan 102, the frictional resistance that prevents the fleeting of the rope 36 decreases while the force pushing the rope 36 outward increases, causing the wraps of rope 36 to move off the tapered portion 154 of the non-driven sloped body 104 and onto the body 126, 128, 130 of the capstan 102 (see generally FIG. 13) in a properly fleeting manner. This creates a self-regulating effect which limits how far up the tapered portion 154 of the non-driven sloped body 104 the rope 36 can climb without requiring any effort from the user in the form of changing the tension of the rope 36 as it tails off of the capstan 102 or the rate of pulling. This greatly reduces the possibility of creating fouling of the rope 36.

It should also be noted that while the non-driven sloped body 104 is preferably independently rotatable about the capstan 102, the non-driven sloped body 104 could be secured to the frame 30 or the motor/gearbox 32 such that it is not rotatable about the capstan 102.

Attention is invited to FIGS. 14-26 and the second embodiment of the antifouling device 200. The antifouling device 200 includes a capstan 202, a non-driven sloped body 204 and a ball bearing 270.

Figure 20:
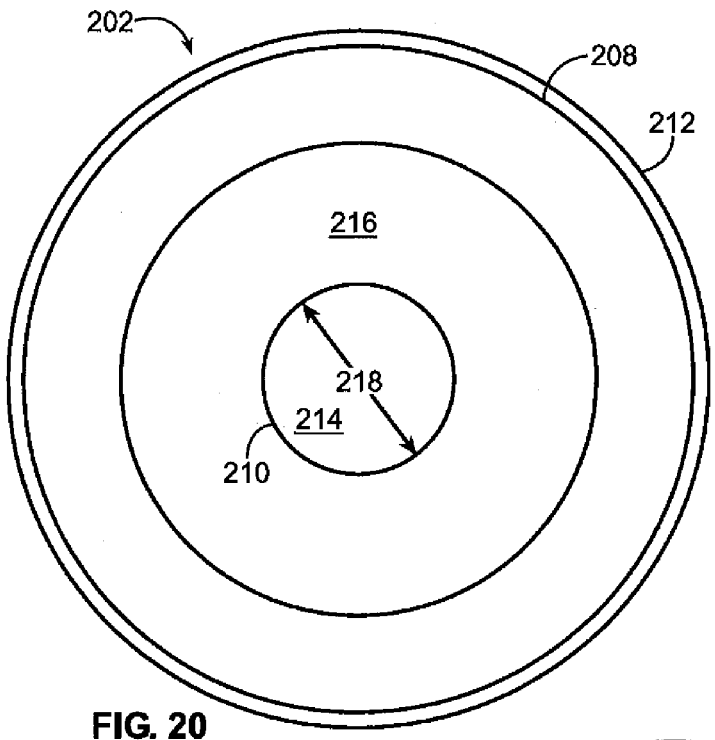
FIG. 20 is a front view of a capstan of the anti-fouling device shown in FIG. 14.
Figure 21:
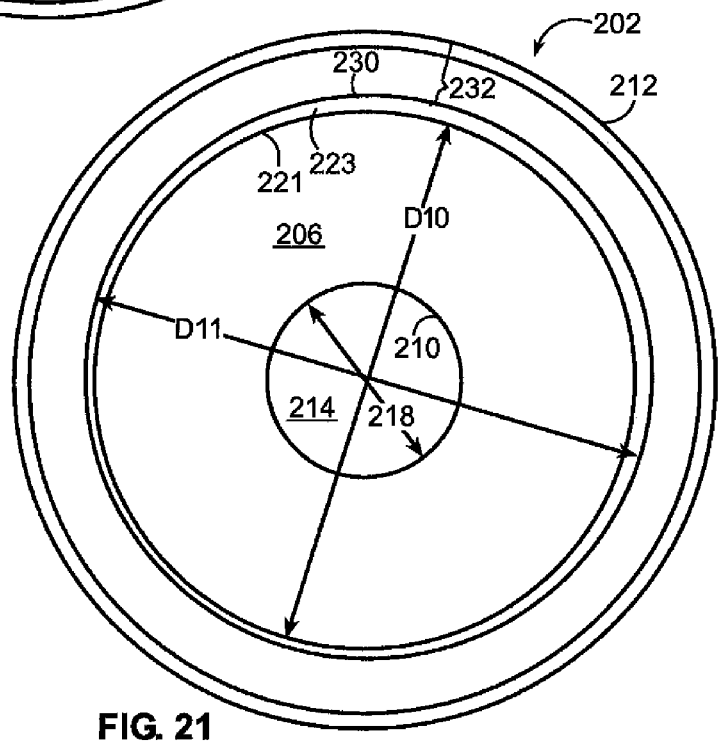
FIG. 21 is a rear view of the capstan shown in FIG. 20.

As shown in FIGS. 14-21 and 26, the capstan 202 of the second embodiment of the anti-fouling device 200 has first and second ends 206, 208 and inner and outer surfaces 210, 212 such that a passageway 214, which defines the inner surface 210, extends through the capstan 202 from the first end 206 to the second end 208. The capstan 202 preferably is rotatable about an axis of rotation X-X, see FIG. 18. As shown in FIG. 20, the inner surface 210 defines a shoulder 216 between the first and second ends 206, 208 such that the passageway 214 has a reduced diameter portion 218 provided between the first end 206 and the shoulder 216. The inner surface 210 at the reduced diameter portion 218 is configured/shaped to retain at least a portion of an output shaft 38 of the motor/gearbox 32 that is received in the reduced diameter portion 218 of the passageway 214.

Figure 16:
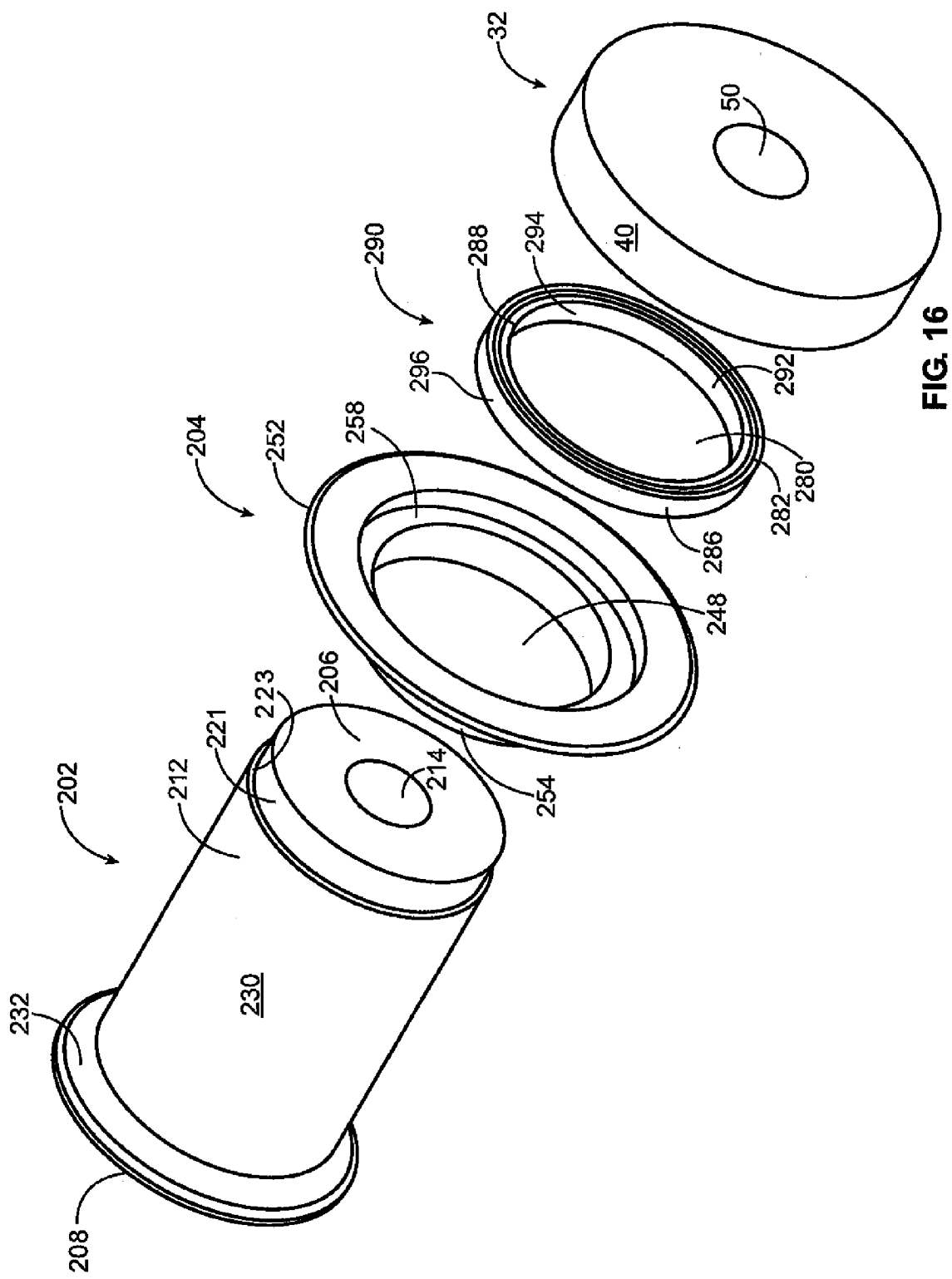
FIG. 16 is an exploded perspective view of the anti-fouling device shown in FIG. 14.
Figure 26:
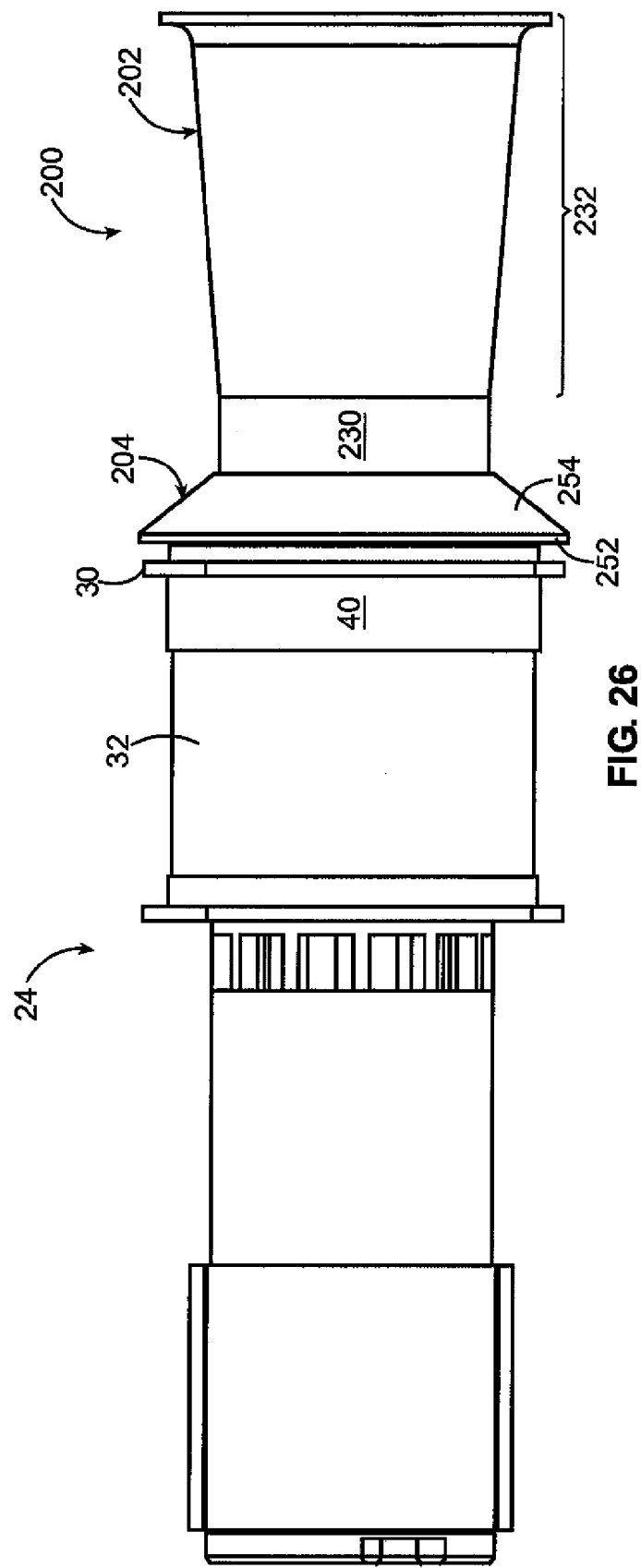
FIG. 26 is a top plan view of a puller assembly including the second embodiment of the anti-fouling device, with the anti-fouling device having an alternative version of the capstan.
Figure 27:
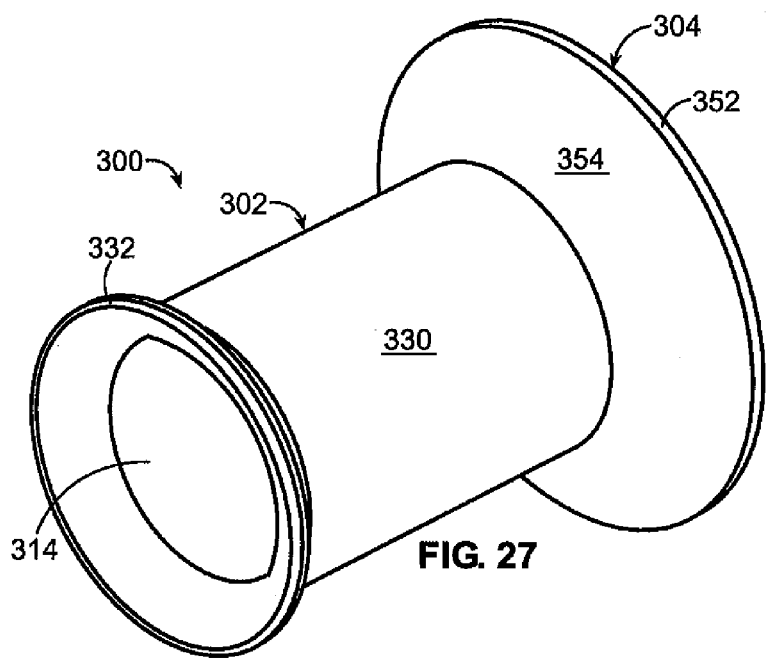
FIG. 27 is a perspective view of a third embodiment of the anti-fouling device which incorporates the features of the invention.
Figure 28:
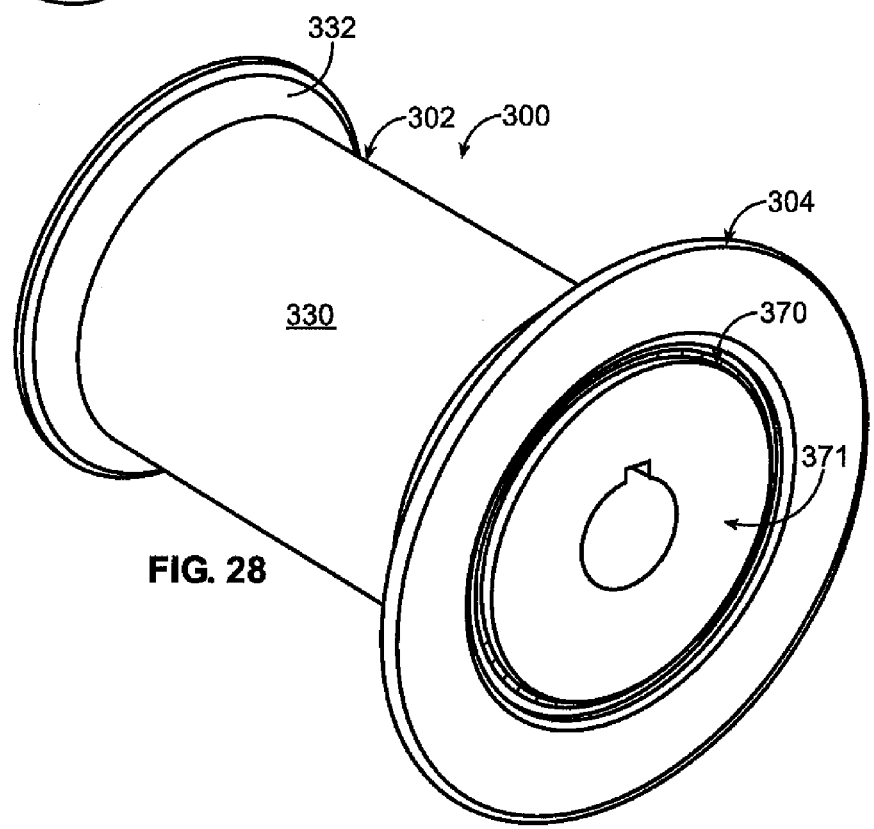
FIG. 28 is an alternative perspective view of the anti-fouling device shown in FIG. 27.
Figure 29:
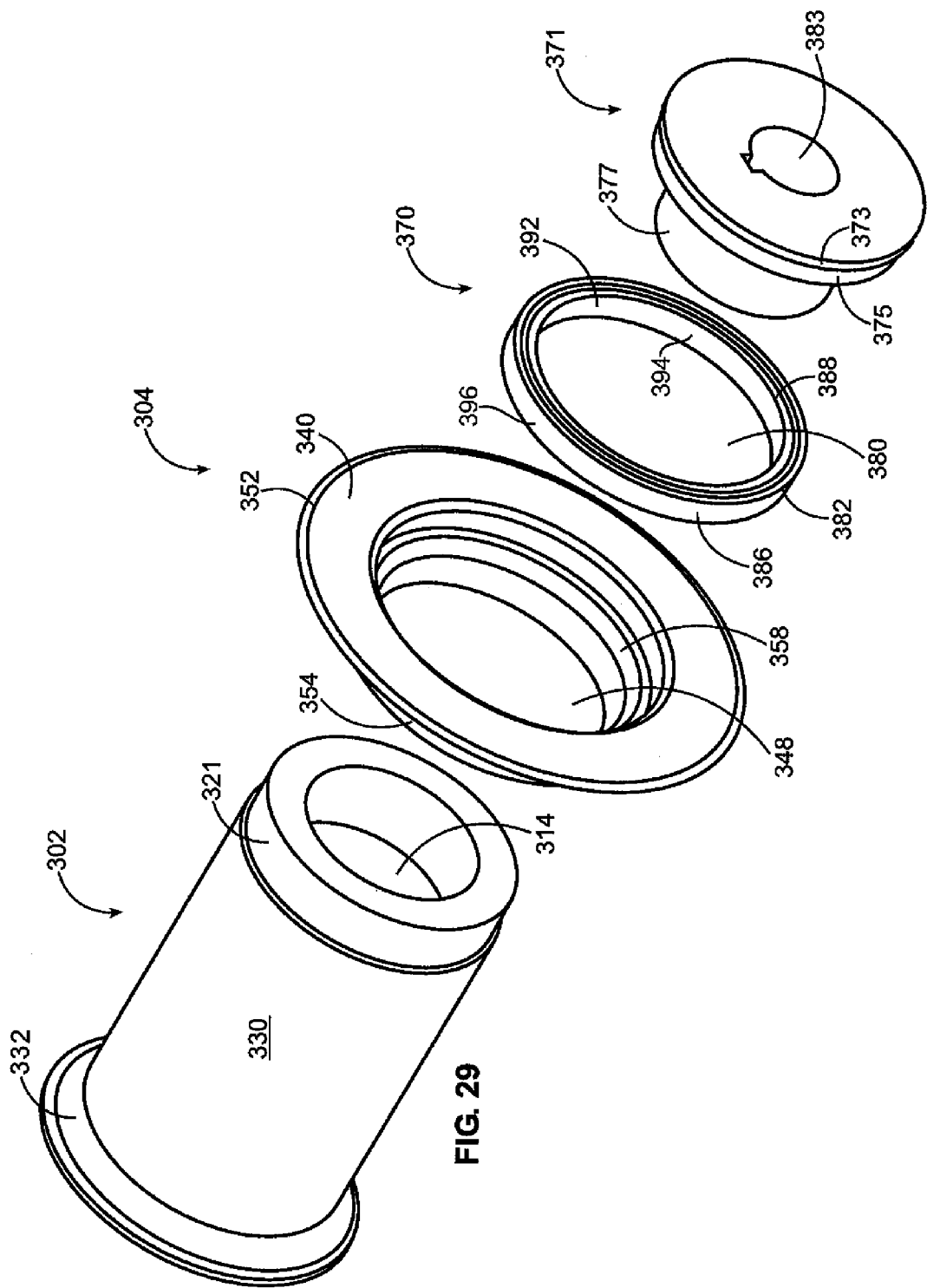
FIG. 29 is an exploded perspective view of the anti-fouling device shown in FIG. 27.
Figure 30:
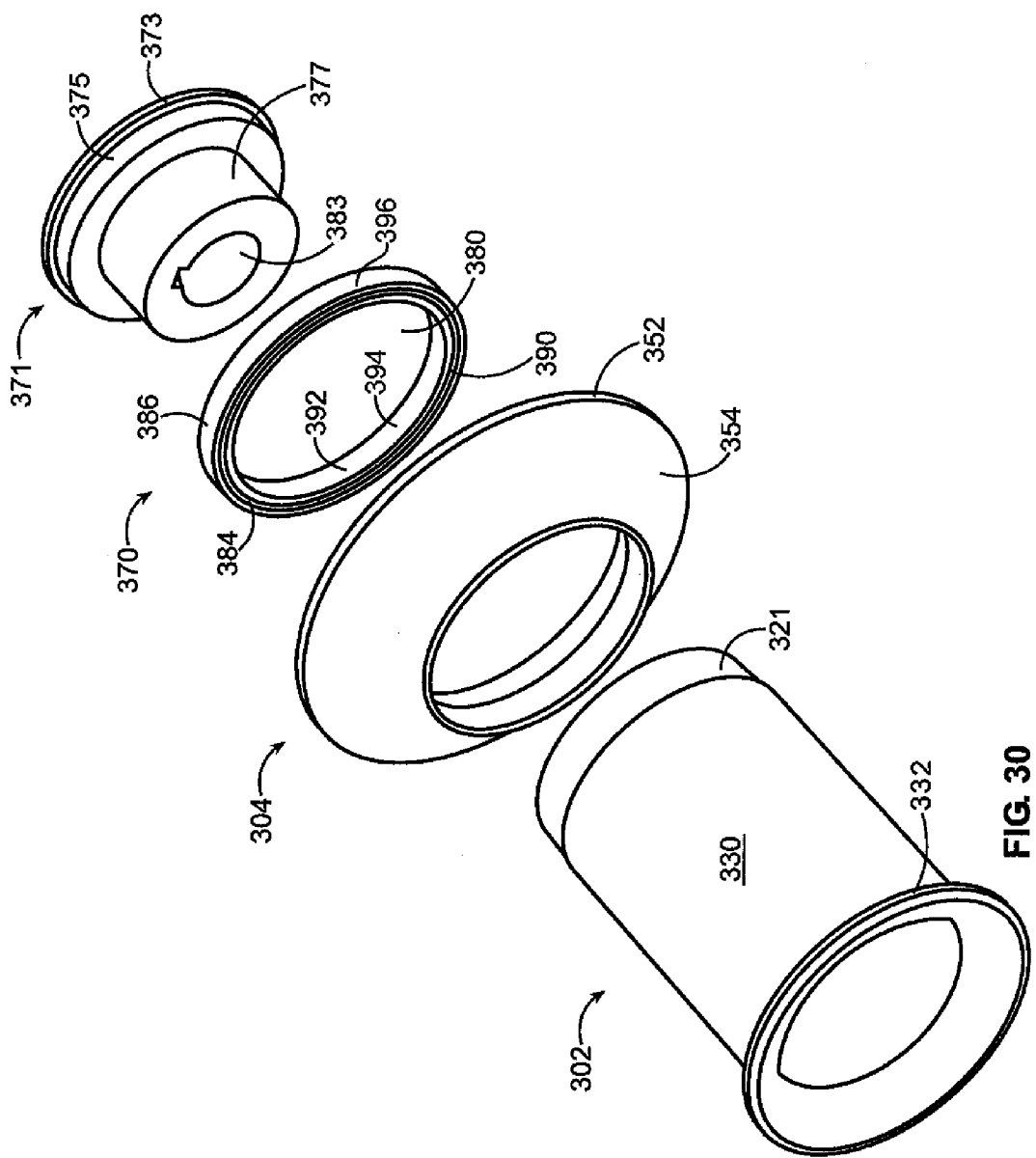
FIG. 30 is an alternative exploded perspective view of the anti-fouling device shown in FIG. 27.

As shown in FIG. 16, the outer surface 212 has a first constant diameter portion 221 that extends from the first end 206 to a shoulder 223 of the capstan 202. The first constant diameter portion 221 has an outer diameter D10, see FIG. 21, about the outer surface 212 thereof. As shown in FIG. 16, the capstan 202 has a second constant diameter portion 230 that extends from the shoulder 223 to an end portion 232 of the capstan 202 which, in turn, extends to the second end 208 of the capstan 202. The second constant diameter portion 230 has an outer diameter D11, see FIG. 21, about the outer surface 212 thereof which is larger than the outer diameter D10. The end portion 232 can be configured in any desired manner, although it typically will be curved as illustrated in FIGS. 14-19 or tapered/curved as illustrated in FIG. 26. The length of the second constant diameter portion 230 between the shoulder 223 and the end portion 232 generally is dependent on the configuration of the end portion 232. It is to be understood that the length of the second constant diameter portion 230 and the configuration of the end portion 232 are independent of the invention and can be changed as desired.

Figure 22:
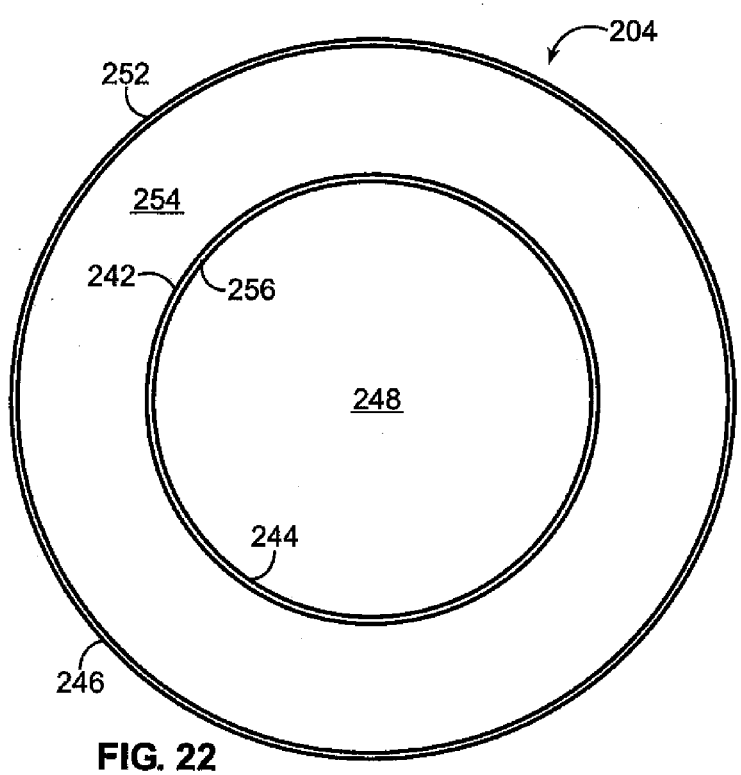
FIG. 22 is a front view of a non-driven sloped body of the anti-fouling device shown in FIG. 14.
Figure 23:
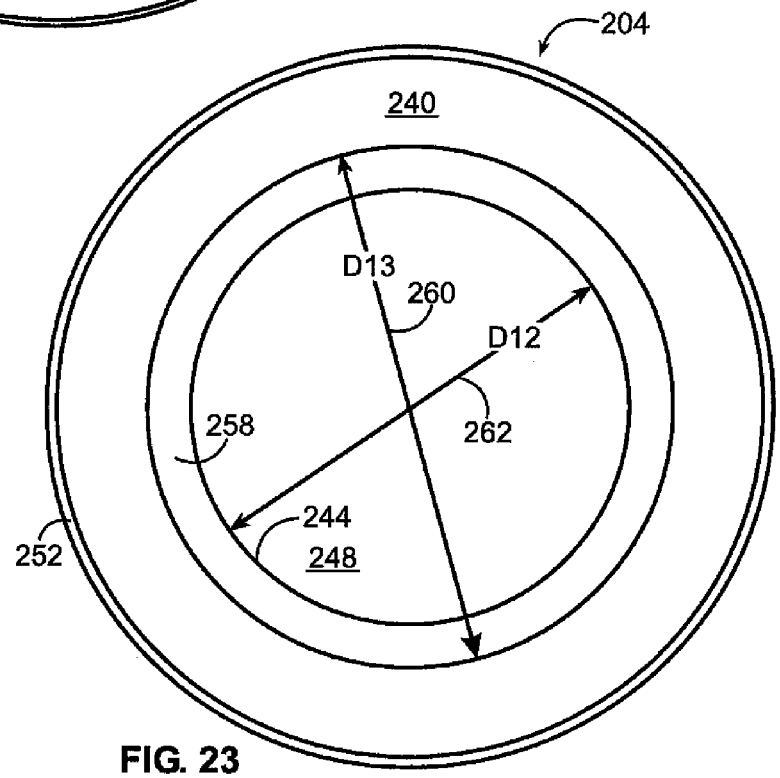
FIG. 23 is a rear view of the non-driven sloped body shown in FIG. 22.

As shown in FIGS. 22 and 23, the non-driven sloped body 204 has first and second ends 240, 242 and inner and outer surfaces 244, 246 such that a passageway 248, defining the inner surface 244, extends through the non-driven sloped body 204 from the first end 240 to the second end 242. The non-driven sloped body 204 preferably is rotatable about the same axis of rotation X-X as is the capstan 202. The outer surface 246 has a curved portion 252 that extends outwardly from the first end 240 to a tapered portion 254. The tapered portion 254 extends angularly outwardly from the curved portion 252 to the second end 242. The tapered portion 254 is preferably angled between the curved portion 252 and the second end 242 at an angle of approximately between thirty-five and fifty-five degrees relative to the axis of rotation X-X, and in a most preferred embodiment the tapered portion 254 is preferably angled between the curved portion 252 and the second end 242 at an angle of approximately forty degrees relative to the axis of rotation X-X. It is to be understood that the tapered portion 254 could be angled at any other suitable angle as desired.

Figure 17:
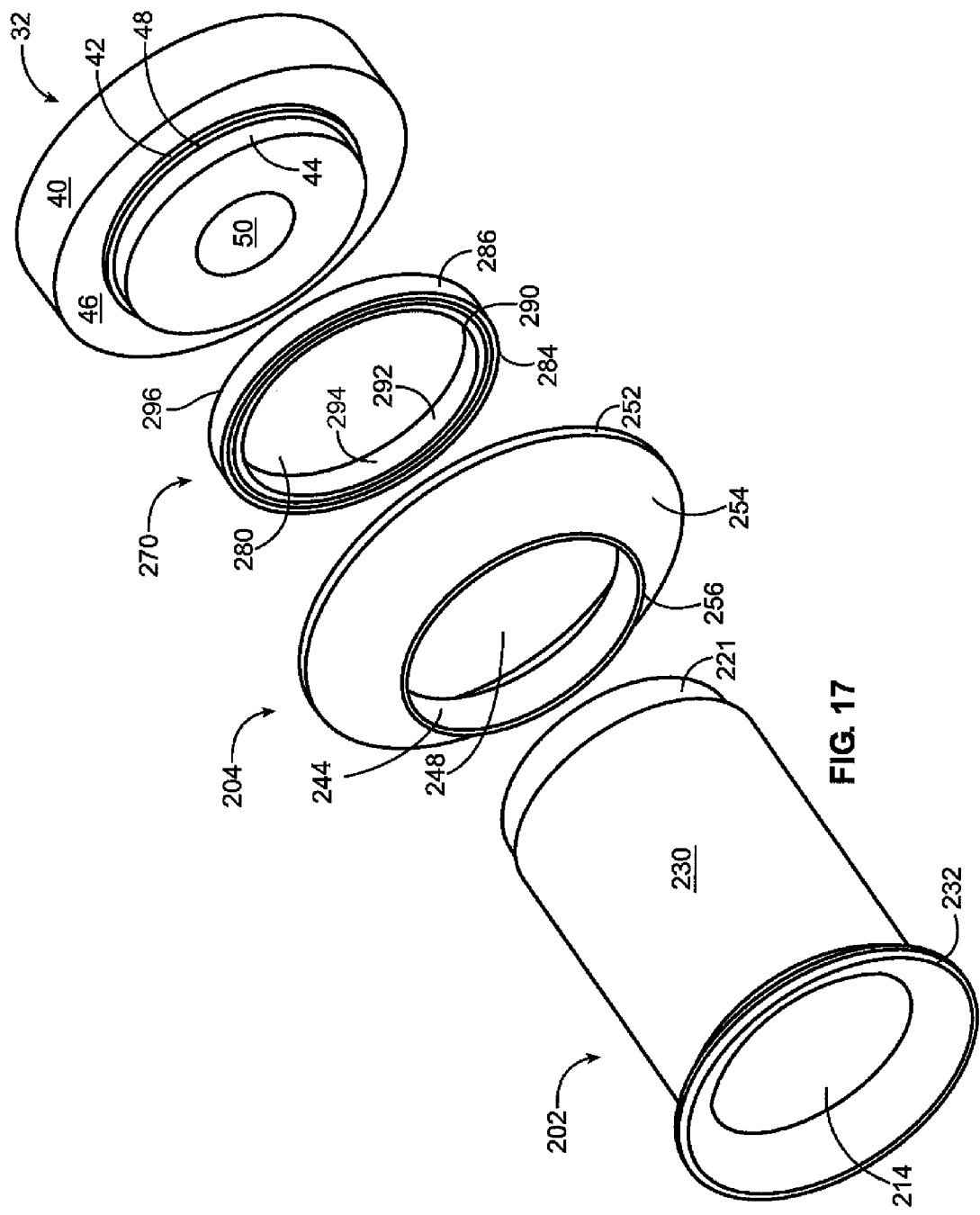
FIG. 17 is an alternative exploded perspective view of the anti-fouling device shown in FIG. 14.

As shown in FIG. 17, a ring-shaped wall 256 extends inwardly from the tapered portion 254 at the second end 242 to the inner surface 244 defined by the passageway 248. The inner surface 244 defines a shoulder 258 between the first and second ends 240, 242 that separates the passageway 248 into first and second portions 260, 262. The shoulder 258 is preferably parallel to the ring-shaped wall 256. The second portion 262 of the passageway 248, defined between the second end 242 and the shoulder 258, preferably has a diameter D12, see FIG. 23, which is slightly larger than the outer diameter D10 of the capstan 202. The first portion 260 of the passageway 248, defined between the first end 240 and the shoulder 258, preferably has a diameter D13, see FIG. 23, which is larger than the diameter D12.

Figure 18:
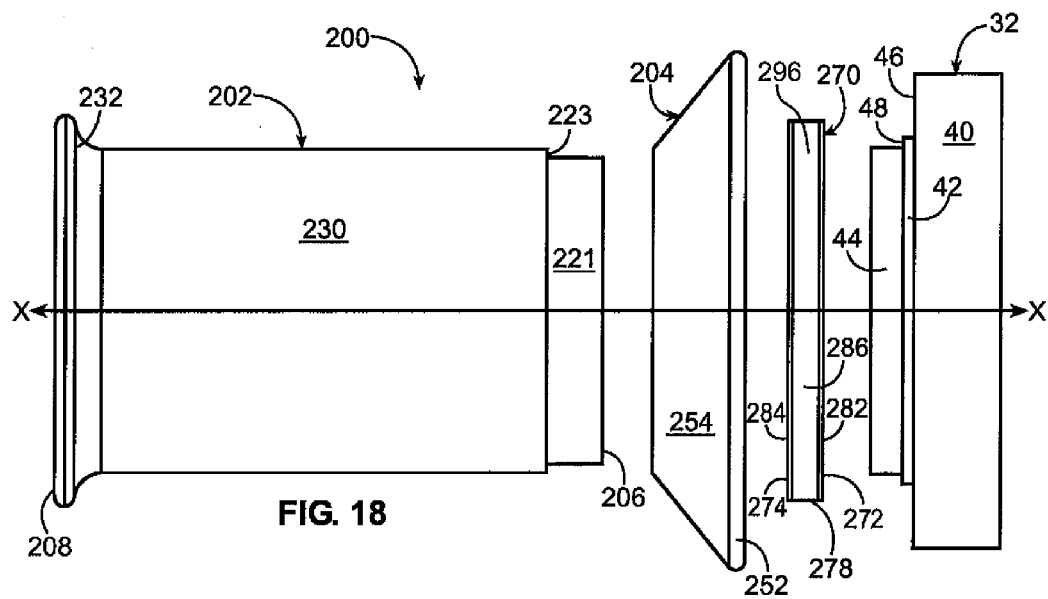
FIG. 18 is an exploded side plan view of the anti-fouling device shown in FIG. 14.
Figure 19:
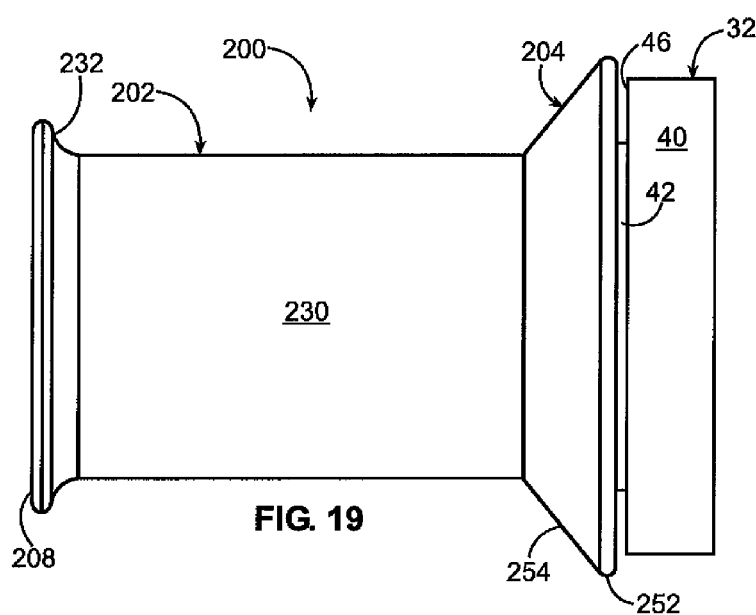
FIG. 19 is a side plan view of the anti-fouling device shown in FIG. 14.
Figure 24:
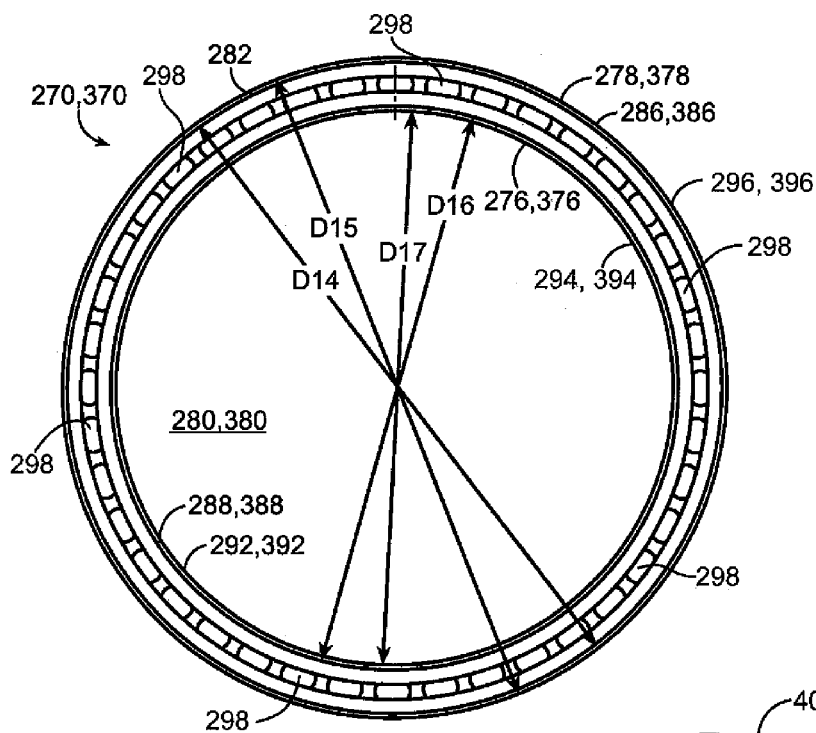
FIG. 24 is a front view of a ball bearing of the anti-fouling device shown in FIG. 14.

As shown in FIGS. 18 and 24, the ball bearing 270 has inner and outer races 294, 296 which capture a plurality of balls 298 therebetween, such that the inner and outer races 294, 296 can rotate relative to one another. The ball bearing 270 has first and second ends 272, 274, an inner surface 276 defined by the inner race 294, and an outer surface 278 defined by the outer race 296. An aperture 280, defined by the inner surface 276, extends through the ball bearing 270 from the first end 272 to the second end 274. The inner and outer races 294, 296 of the ball bearing 270 are preferably rotatable about the same axis of rotation X-X as is the capstan 202. The outer surface 278 of the outer race 296 has first and second tapered portions 282, 284 and a constant diameter portion 286 therebetween. The first tapered portion 282 extends angularly from the first end 272 to the constant diameter portion 286, and the second tapered portion 284 extends angularly from the constant diameter portion 286 to the second end 274. The outer surface 278 has an outer diameter D14, see FIG. 24, at the first and second ends 272, 274 and an outer diameter D15, see FIG. 24, at the constant diameter portion 286. The outer diameter D15 is larger than the outer diameter D14. The inner surface 276 of the inner race 294 has first and second tapered portions 288, 290 and a constant diameter portion 292 therebetween. The first tapered portion 288 extends angularly from the first end 272 to the constant diameter portion 292 and the second tapered portion 290 extends angularly from the constant diameter portion 192 to the second end 274. The inner surface 276 defines an inner diameter D16, see FIG. 24, at the first and second ends 272, 274, which is less than the outer diameter D14, and an inner diameter D17, see FIG. 24, at the constant diameter portion 292, with the inner diameter D16 being larger than the inner diameter D17.

Figure 25:
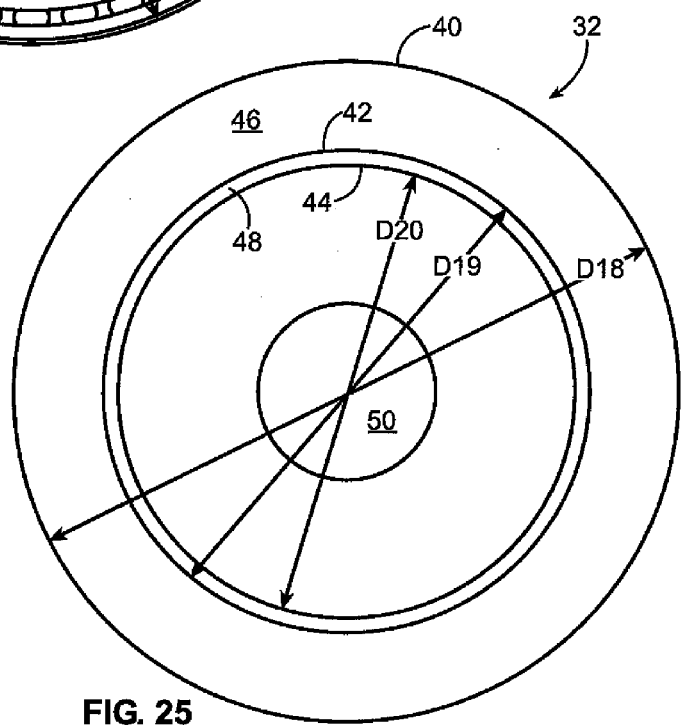
FIG. 25 is a front view of a motor/gearbox which is configured to be operatively associated with the anti-fouling device shown in FIG. 14.

As shown in FIG. 25, the motor/gearbox 32 has a first, second and third constant diameter portions 40, 42, 44 which are separated from one another by shoulders 46, 48. Shoulder 46 separates the first constant diameter portion 40 from the second constant diameter portion 42, and shoulder 48 separates the second constant diameter portion 42 from the third constant diameter portion 44. As shown in FIG. 25, the first constant diameter portion 40 defines an outer diameter D18, the second constant diameter portion 42 defines an outer diameter D19, and the third constant diameter portion 44 defines an outer diameter D20. Outer diameter D18 is larger than outer diameter D19, and outer diameter D19 is larger than outer diameter D20. An aperture 50 extends through the constant diameter portions 40, 42, 44 of the motor/gearbox 32 such that an output shaft (not shown), but similar/identical to output shaft 38, of the motor/gearbox 32 can extend therethrough.

The capstan 202 is positioned such that the first end 206 is in the passageway 248 of the non-driven sloped body 204, with the second end 242 of the non-driven sloped body 204 in abutting relationship with the shoulder 216 of the capstan 202, but such that the capstan 202 is rotatable relative to the non-driven sloped body 204. The outer race 296 of the ball bearing 270 is pressed into the non-driven sloped body 204, preferably in a loose fit, such that diameter D15 of the ball bearing 270 is preferably generally equal to or slightly larger than diameter D13 of the non-driven sloped body 204. The second end 274 of the ball bearing 270 is thus in the passageway 248 of the non-driven sloped body 204 and in abutting relationship with the shoulder 258 of the non-driven sloped body 204, such that the non-driven sloped body 204 and the outer race 296 of the ball bearing 270 are rotatable relative to the inner race 294 of the ball bearing 270. The inner race 294 of the ball bearing 270 is pressed onto the motor/gearbox 32, preferably in a tight fit, as the inner diameter D17 of the ball bearing 270 is generally equal to or slightly smaller than the outer diameter D19 of the second constant diameter portion 42 of the motor/gearbox 32. Thus, the first end 272 of the ball bearing 270 is in abutting relationship with the shoulder 48 of the motor/gearbox 32, with the inner surface 276 of the ball bearing 270 being positioned around the first and second constant diameter portions 40, 42 of the motor/gearbox 32, such that the motor/gearbox 32 and the inner race 294 of the ball bearing 270 are rotatable relative to the outer race 296 of the ball bearing 270. The frame 30 of the puller assembly 24 is configured to preferably be positioned around and secured to the first constant diameter portion 40 of the motor/gearbox 32, preferably by bolting. The output shaft (not shown) of the motor/gearbox 32 is configured to be positioned within the passageway 214 of the capstan 202 and secured thereto such that rotation of the output shaft causes rotation of the capstan 202.

With the capstan 202 secured in place, the capstan 202 prevents outward movement of the non-driven sloped body 204 and the ball bearing 270, and the motor/gearbox 32 prevents inward movement of the non-driven sloped body 204 and the ball bearing 270, thus essentially securing the non-driven sloped body 204 and the ball bearing 270 in place.

Thus, unlike in the first embodiment of the anti-fouling device 100, the anti-fouling device 200 of the second embodiment has the entire sloped surface being a part of the non-driven sloped body 204 (namely the tapered portion 254). An advantage of this configuration of the anti-fouling device 200 is that it prevents any torque produced by the capstan 202 from being transferred to the rope 36 that is wound onto the non-driven sloped body 204, minimizing the tractive frictional force that will impede the proper fleeting of the rope 36.

The non-driven sloped body 204 is mounted on the ball bearing 270, which supports the axial and radial loads created by the pulling rope 36 as it is wound onto the capstan 202. The ball bearing 270 is seated proximate to the frame 30 either directly or indirectly as desired. Because of this configuration, all of the forces of the rope 36 pushing against the sloped surface are transferred to the motor/gearbox 32 or to the frame 30.

Attention is invited to FIGS. 24 and 27-39 and the third embodiment of the antifouling device 300. The antifouling device 300 includes a capstan 302, a non-driven sloped body 304, a ball bearing 370, and a capstan hub 371.

Figure 33:
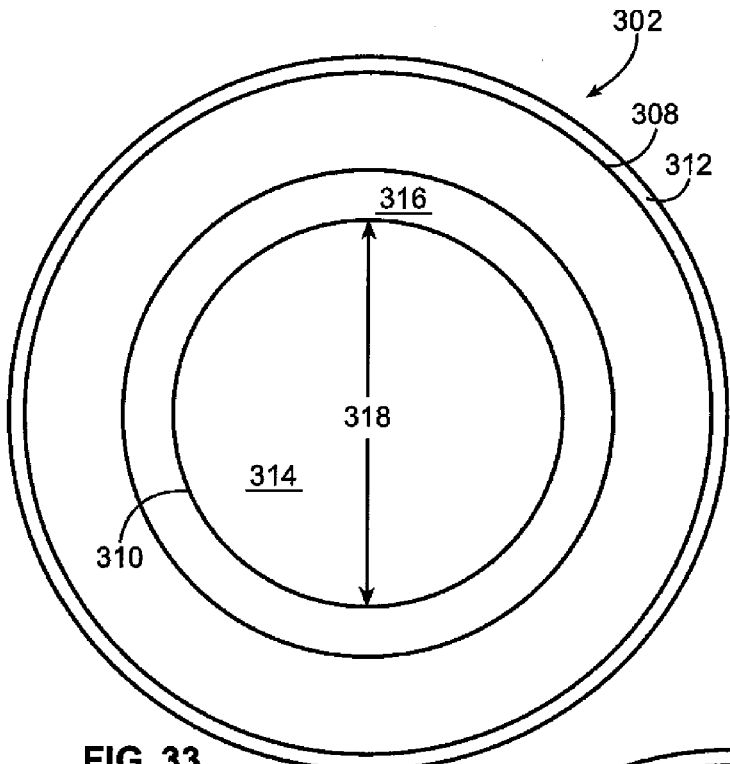
FIG. 33 is a front view of a capstan of the anti-fouling device shown in FIG. 27.
Figure 34:
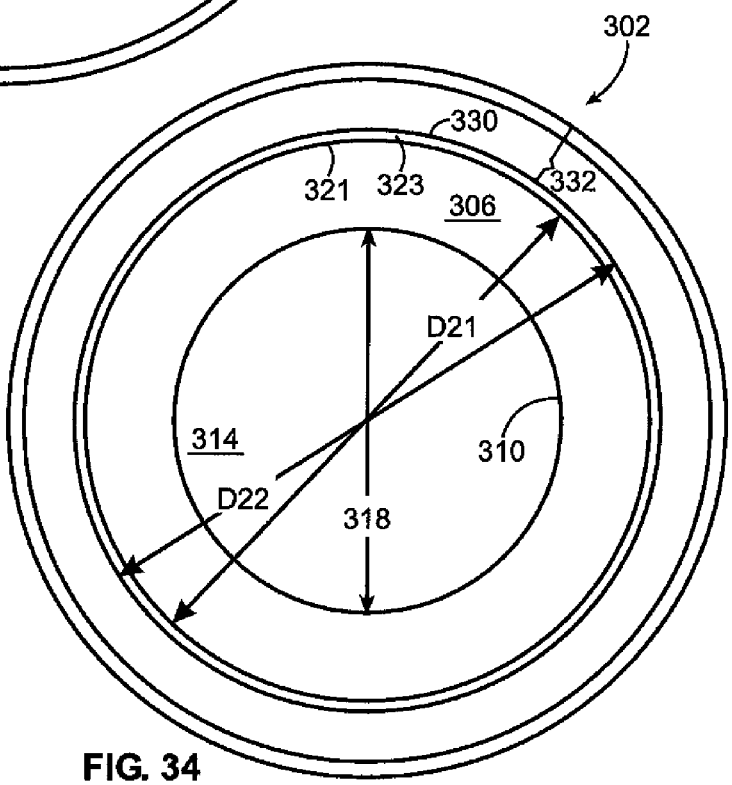
FIG. 34 is a rear view of the capstan shown in FIG. 33.

As shown in FIGS. 27-34 and 39, the capstan 302 has first and second ends 306, 308 and inner and outer surfaces 310, 312. A passageway 314, which defines the inner surface 310 of the capstan 302, extends from the first end 306 to the second end 308. The capstan 302 preferably is rotatable about an axis of rotation X-X, see FIG. 32. As illustrated in FIG. 33, the inner surface 310 defines a shoulder 316 between the first and second ends 306, 308 such that the passageway 314 has a reduced diameter portion 318 provided between the first end 306 and the shoulder 316. The inner surface 310 at the reduced diameter portion 318 is configured/shaped to retain at least a portion of the capstan hub 371 that is received in the reduced diameter portion 318 of the passageway 314.

Figure 31:
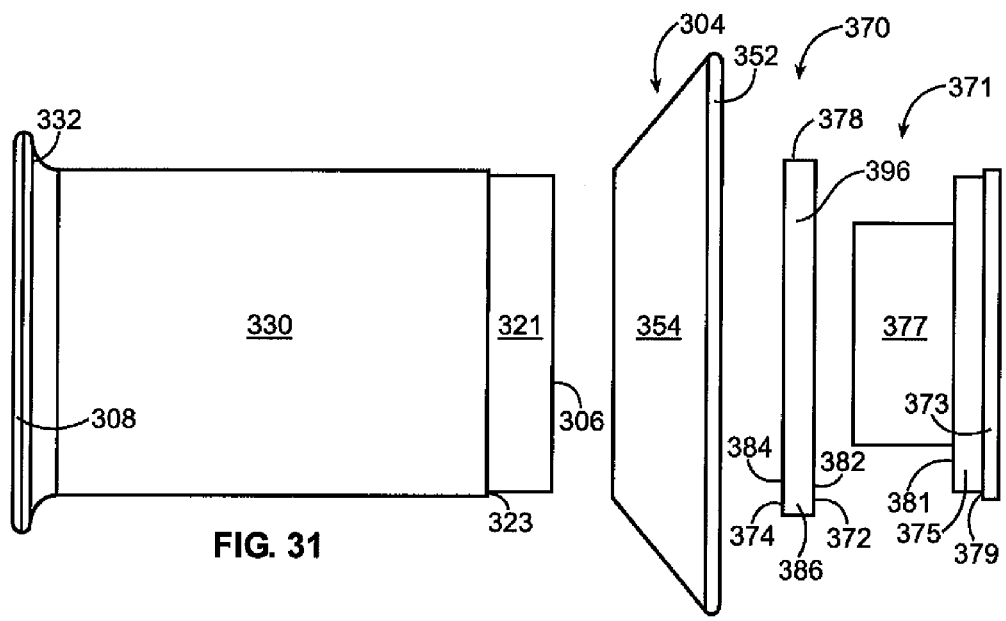
FIG. 31 is an exploded side plan view of the anti-fouling device shown in FIG. 27.
Figure 32:
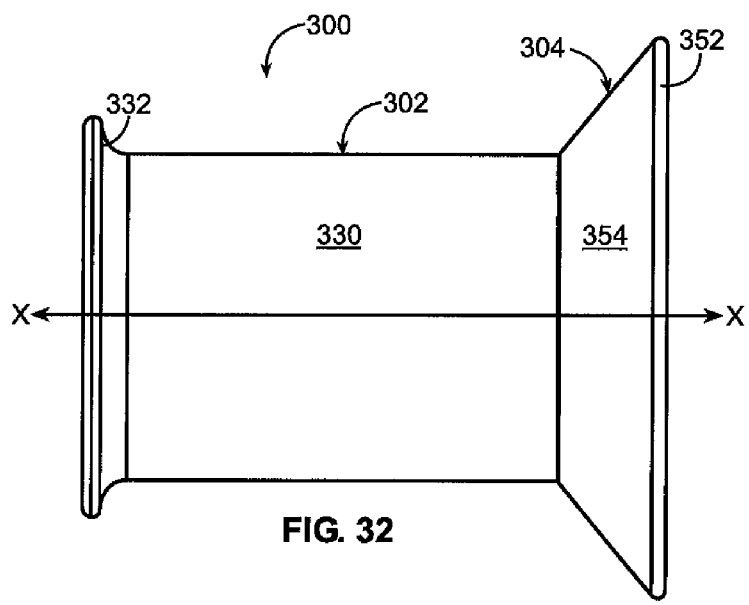
FIG. 32 is a side plan view of the anti-fouling device shown in FIG. 27.

As shown in FIG. 31, the outer surface 312 of the capstan 302 has a first constant diameter portion 321 that extends from the first end 306 to a shoulder 323 of the capstan 302. The first constant diameter portion 321 has an outer diameter D21, see FIG. 34, about the outer surface 312 thereof. The capstan 302 has a second constant diameter portion 330 that extends from the shoulder 323 to an end portion 332 of the capstan 302 which, in turn, extends to the second end 308 of the capstan 302. The second constant diameter portion 330 has an outer diameter D22, see FIG. 34, about the outer surface 312 thereof, which is larger than the outer diameter D21. The end portion 332 can be configured in any desired manner, although it typically will be tapered/curved (not shown) or curved as illustrated in FIGS. 27-32 and 39. The length of the second constant diameter portion 30 between the shoulder 323 and the end portion 332 generally is dependent on the configuration of the end portion 332. It is to be understood that the length of the second constant diameter portion 330 and the configuration of the end portion 332 are independent of the invention and can be changed as desired.

Figure 35:
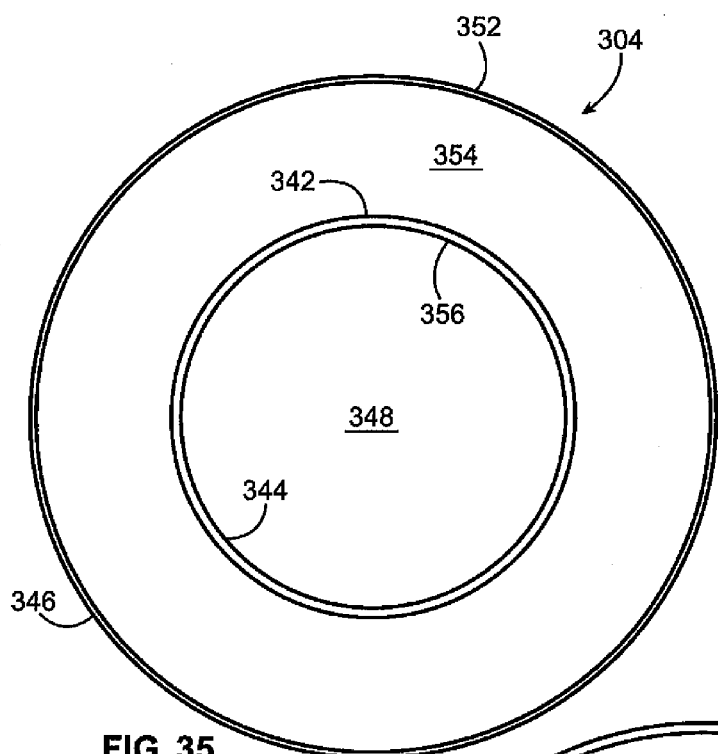
FIG. 35 is a front view of a non-driven sloped body of the anti-fouling device shown in FIG. 27.
Figure 36:
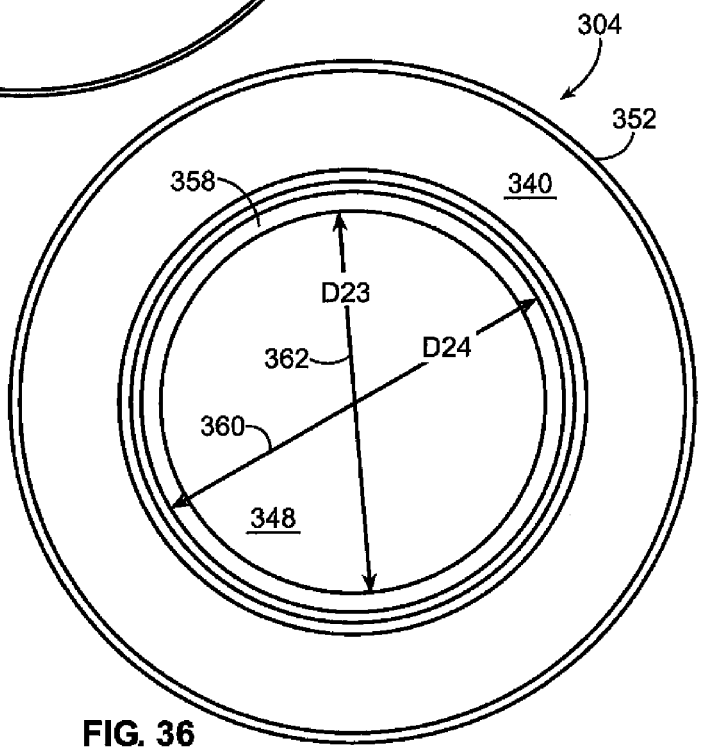
FIG. 36 is a rear view of the non-driven sloped body shown in FIG. 35.

As shown in FIGS. 31, 35 and 36, the non-driven sloped body 304 has first and second ends 340, 342 and inner and outer surfaces 344, 346 such that a passageway 348, defining the inner surface 344, extends through the non-driven sloped body 304 from the first end 340 to the second end 342. The non-driven sloped body 304 preferably is rotatable about the same axis of rotation X-X as is the capstan 302. The outer surface 346 has a curved portion 352 that extends outwardly from the first end 340 to a tapered portion 354. The tapered portion 354 extends angularly outwardly from the curved portion 352 to the second end 342. The tapered portion 354 is preferably angled between the curved portion 352 and the second end 342 at an angle of approximately between thirty-five and fifty-five degrees relative to the axis of rotation X-X, and in a most preferred embodiment the tapered portion 354 is preferably angled between the curved portion 352 and the second end 342 at an angle of approximately forty degrees relative to the axis of rotation X-X. It is to be understood that the tapered portion 354 could be angled at any other suitable angle as desired.

As shown in FIG. 35, a ring-shaped wall 356 extends inwardly from the tapered portion 354 at the second end 342 to the inner surface 344 defined by the passageway 348. As shown in FIG. 36, the inner surface 344 defines a shoulder 358 between the first and second ends 340, 342 that separates the passageway 348 into first and second portions 360, 362. The shoulder 358 is preferably parallel to the ring-shaped wall 356. The second portion 362 of the passageway 348, defined between the second end 342 and the shoulder 358, preferably has a diameter D23, see FIG. 36, which is slightly larger than the outer diameter D21 of the capstan 302. The first portion 360 of the passageway 348, defined between the first end 340 and the shoulder 358, preferably has a diameter D24, see FIG. 36, at shoulder 358 which is larger than the diameter D23, although the diameter of the first portion 360 enlarges from the shoulder 358 to the first end 340 as the aperture wall is first tapered, then constant, and then tapered to the first end 340.

As shown in FIGS. 18 and 24, the ball bearing 370 has inner and outer races 394, 396 which capture a plurality of balls 398 therebetween, such that the inner and outer races 394, 396 can rotate relative to one another. The ball bearing 370 has first and second ends 372, 374, an inner surface 376 defined by the inner race 394, and an outer surface 378 defined by the outer race 396. An aperture 380, defined by the inner surface 376, extends through the ball bearing 370 from the first end 372 to the second end 374. The inner and outer races 394, 396 of the ball bearing 370 are preferably rotatable about the same axis of rotation X-X as is the capstan 302. The outer surface 378 of the outer race 396 has first and second tapered portions 382, 384 and a constant diameter portion 386 therebetween. The first tapered portion 382 extends angularly from the first end 372 to the constant diameter portion 386, and the second tapered portion 384 extends angularly from the constant diameter portion 386 to the second end 374. The outer surface 378 has an outer diameter D14, see FIG. 24, at the first and second ends 372, 374 and an outer diameter D15, see FIG. 24, at the constant diameter portion 386. The outer diameter D15 is larger than the outer diameter D14. The inner surface 376 of the inner race 394 has first and second tapered portions 388, 390 and a constant diameter portion 392 therebetween. The first tapered portion 388 extends angularly from the first end 372 to the constant diameter portion 392 and the second tapered portion 390 extends angularly from the constant diameter portion 392 to the second end 374. The inner surface 376 defines an inner diameter D16, see FIG. 24, at the first and second ends 372, 374, which is less than the outer diameter D14, and an inner diameter D17, see FIG. 24, at the constant diameter portion 392, with the inner diameter D16 being larger than the inner diameter D17.

Figure 37:
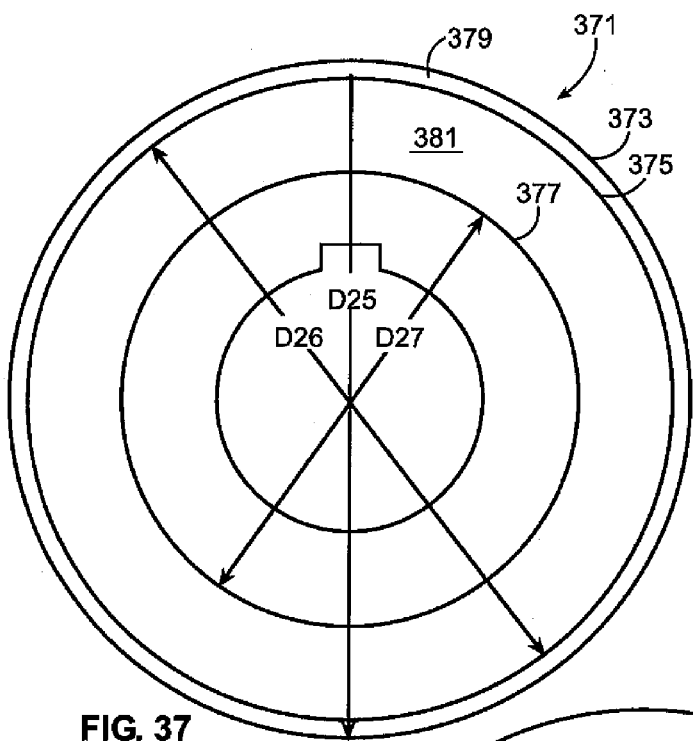
FIG. 37 is a front view of a capstan hub of the anti-fouling device shown in FIG. 27.
Figure 38:
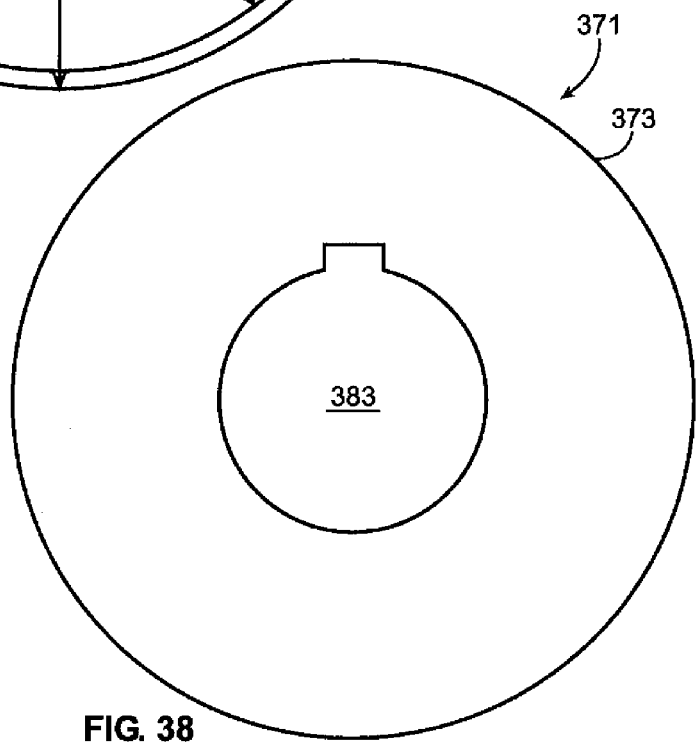
FIG. 38 is a rear view of the capstan hub shown in FIG. 37.

As shown in FIGS. 37 and 38, the capstan hub 371 has a first, second and third constant diameter portions 373, 375, 377 which are separated from one another by shoulders 379, 381. The shoulder 379 separates the first constant diameter portion 373 from the second constant diameter portion 375 and the shoulder 381 separates the second constant diameter portion 375 from the third constant diameter portion 377. As shown in FIG. 37, the first constant diameter portion 373 defines an outer diameter D25, the second constant diameter portion 375 defines an outer diameter D26, and the third constant diameter portion 377 defines an outer diameter D27. The outer diameter D25 is larger than outer diameter D26 and outer diameter D26 is larger than outer diameter D27. A keyhole passageway 383 extends through the constant diameter portions 373, 375, 377 of the capstan hub 371 such that an output shaft (not shown) of the motor/gearbox 32 can extend therethrough.

Figure 39:
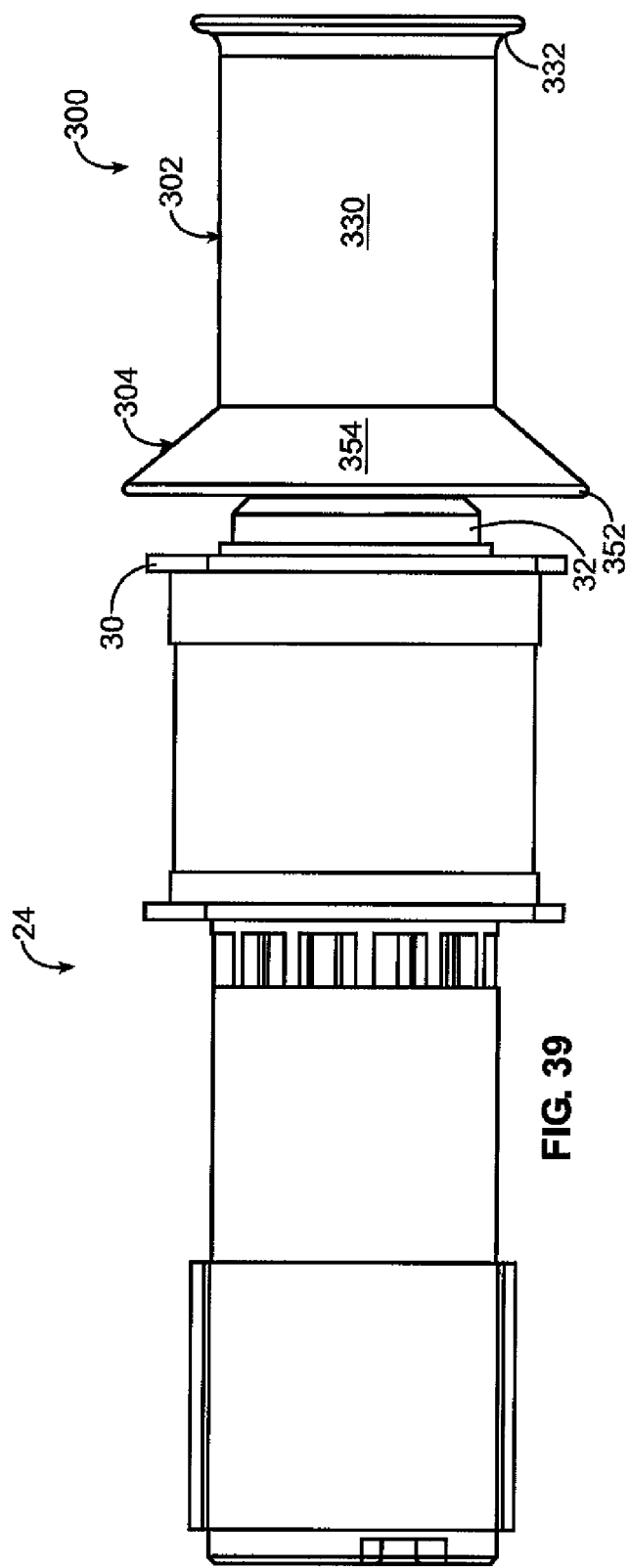
FIG. 39 is a top plan view of a puller assembly including the third embodiment of the anti-fouling device.

The capstan 302 is positioned such that the first end 306 is in the passageway 348 of the non-driven sloped body 304, with the second end 342 of the non-driven sloped body 304 in abutting relationship with the shoulder 316 of the capstan 302, but such that the capstan 302 is rotatable relative to the non-driven sloped body 304. The outer race 396 of the ball bearing 370 is pressed into the non-driven sloped body 304, preferably in a loose fit, such that diameter D15 of the ball bearing 370 is preferably generally equal to or slightly larger than diameter D24 of the non-driven sloped body 304. The second end 374 of the ball bearing 370 is thus in the passageway 348 of the non-driven sloped body 304 and in abutting relationship with the shoulder 358 of the non-driven sloped body 304, such that the non-driven sloped body 304 and the outer race 396 of the ball bearing 370 are rotatable relative to the inner race 394 of the ball bearing 370. The inner race 394 of the ball bearing 370 is pressed onto the capstan hub 371, preferably in a tight fit, as the inner diameter D17 of the ball bearing 370 is generally equal to or slightly smaller than the outer diameter D26 of the second constant diameter portion 375 of the capstan hub 371. Thus, the first end 372 of the ball bearing 370 is in abutting relationship with the shoulder 379 of the capstan hub 371 with the inner surface 376 of the ball bearing 370 being positioned around the second constant diameter portion 375 of the capstan hub 371, such that the capstan hub 371 and the inner race 394 of the ball bearing 370 are rotatable relative to the outer race 396 of the ball bearing 370. The first constant diameter portion 373 of the capstan hub 371 is configured to preferably be positioned proximate to the motor/gearbox 32 and the frame 30 as best illustrated in FIG. 39. The output shaft (not shown) of the motor/gearbox 32 is configured to be positioned within the passageway 383 of the capstan hub 371 and secured thereto such that rotation of the output shaft causes rotation of the capstan hub 371 which, in turn, causes rotation of the capstan 302.

With the capstan 302 and the capstan hub 371 secured in place, the capstan 302 prevents outward movement of the non-driven sloped body 304 and the ball bearing 370, and the motor/gearbox 32 prevents inward movement of the non-driven sloped body 304 and the ball bearing 370, thus securing the non-driven sloped body 304 and the ball bearing 370 in place.

Thus, unlike in the first embodiment of the anti-fouling device 100, and like the anti-fouling device 200 of the second embodiment, the anti-fouling device 300 has the entire sloped surface being a part of the non-driven sloped body 304 (namely the tapered portion 354). An advantage of this configuration of the anti-fouling device 300, is that it prevents any torque produced by the capstan 302 from being transferred to the rope 36 that is wound onto the non-driven sloped body 304, minimizing the tractive frictional force that will imped the proper fleeting of the rope 36. The non-driven sloped body 304 is mounted on the ball bearing 370, which supports the axial and radial loads created by the pulling rope 36 as it is wound onto the capstan 302. The ball bearing 370 is seated proximate to the frame 30 either directly or indirectly as desired. Because of this configuration, all of the forces of the rope 36 pushing against the sloped surface are transferred to the capstan hub 371, rather than the motor/gearbox 32 or to the frame 30 as in the second embodiment, such that all of the forces are self-contained within the anti-fouling device 300.

The anti-fouling device, which includes a capstan and a non-driven sloped body, satisfies the aforementioned needs for a less expensive, more reliable, and more user friendly anti-fouling device, especially one that is well-suited for cable pullers. Although the second and third embodiments were described to include ball bearings, it is contemplated that those skilled in the art may achieve the invention in other ways by using other types of bearings and devices that reduce rotational friction or tractive friction.

While preferred embodiments of the present invention are shown and described, it is envisioned that those skilled in the art may devise various modifications of the present invention without departing from the spirit and scope of the foregoing description, the attached drawings and the appended claims.

The invention is claimed as follows:

1. An anti-fouling device connected to a motor which is mounted on a cable puller, said anti-fouling device comprising:
a capstan having a first end and a second opposite end and a passageway therein, said capstan is capable of being driven by the motor and is rotatable about an axis of rotation; and
a non-driven body having a first end and a second opposite end and a passageway therethrough, said non-driven body positioned at said first end of said capstan, said non-driven body is not capable of being driven by the motor, said non-driven body defining a sloped surface that biases incoming rope that wraps around said sloped surface down onto said capstan, said passageways aligning with each other along said axis of rotation.

2. The anti-fouling device as defined in claim 1, wherein said sloped surface of said non-driven body is defined at an angle of approximately between thirty-five and fifty-five degrees relative to said axis of rotation.

3. The anti-fouling device as defined in claim 2, wherein said sloped surface of said non-driven body is defined at an angle of approximately forty degrees relative to said axis of rotation.

4. The anti-fouling device as defined in claim 1, wherein said capstan defines a sloped surface such that said sloped surfaces are generally contiguous.

5. The anti-fouling device as defined in claim 4, wherein said sloped surface of said non-driven body is defined at an angle relative to said axis of rotation which is equivalent to an angle at which said sloped surface of said capstan is defined.

6. The anti-fouling device as defined in claim 5, wherein said sloped surface of said non-driven body is defined at an angle of approximately between thirty-five and fifty-five degrees relative to said axis of rotation.

7. The anti-fouling device as defined in claim 6, wherein said sloped surface of said non-driven body is defined at an angle of approximately forty degrees relative to said axis of rotation.

8. The anti-fouling device as defined in claim 1, wherein said non-driven body is rotatable about said axis of rotation independently of said capstan being rotated about said axis of rotation.

9. The anti-fouling device as defined in claim 8, further comprising a ball bearing positioned between said capstan and said non-driven body, said ball bearing configured to be rotatable about said capstan, said non-driven body configured to be rotatable about said ball bearing.

10. The anti-fouling device as defined in claim 1, further comprising a driven capstan hub which is configured to be positioned within and secured to said capstan, said driven capstan hub being rotatable about said axis of rotation, wherein rotation of said capstan hub causes rotation of said capstan.

11. A puller assembly comprising:
a housing assembly;
a motor assembly secured to said housing assembly, said motor assembly having an output shaft extending out of said housing assembly, said output shaft configured to be rotated about an axis of rotation;
an anti-fouling device having a capstan and a body, said output shaft operatively associated with said capstan in order to rotate said capstan about said axis of rotation, said body being positioned at an end of said capstan, said body being positioned around said output shaft and between said housing assembly and said capstan, said body defining a sloped surface that biases incoming rope that wraps around said sloped surface down onto said capstan.

12. The puller assembly as defined in claim 11, wherein said sloped surface is defined at an angle of approximately between thirty-five and fifty-five degrees relative to said axis of rotation.

13. The puller assembly as defined in claim 12, wherein said sloped surface is defined at an angle of approximately forty degrees relative to said axis of rotation.

14. The puller assembly as defined in claim 11, wherein said capstan defines a sloped surface such that said sloped surfaces are generally contiguous.

15. The puller assembly as defined in claim 14, wherein said sloped surface of said body is defined at an angle relative to said axis of rotation which is equivalent to an angle at which said sloped surface of said capstan is defined.

16. The puller assembly as defined in claim 15, wherein said sloped surface of said body is defined at an angle of approximately between thirty-five and fifty-five degrees relative to said axis of rotation.

17. The puller assembly as defined in claim 16, wherein said sloped surface of said body is defined at an angle of approximately forty degrees relative to said axis of rotation.

18. The puller assembly as defined in claim 11, wherein said body is rotatable about said axis of rotation independently of said capstan being rotated about said axis of rotation.

19. The puller assembly as defined in claim 18, further comprising a ball bearing positioned between said capstan and said body, said ball bearing configured to be rotatable about said capstan, said body configured to be rotatable about said ball bearing.

20. The puller assembly as defined in claim 11, further comprising a capstan hub which is positioned within and secured to said capstan, said output shaft of said motor assembly positioned within and secured to said capstan hub such that said capstan hub is rotatably driven about said axis of rotation by said motor assembly, wherein rotation of said capstan hub causes rotation of said capstan.

21. The puller assembly as defined in claim 11, wherein a portion of said motor assembly extends out of said housing assembly such that said portion of said motor assembly is at least partially positioned within said capstan, said output shaft extending out of said portion of said motor assembly and being positioned within and secured to said capstan.

22. The puller as defined in claim 11, further comprising
a boom extending from said housing assembly; and
a conduit attachment system at a free end of said boom.

23. The anti-fouling device as defined in claim 1, wherein said first end of said capstan is seated within said passageway of said non-driven body.

24. The puller assembly as defined in claim 11, wherein said capstan has a passageway therein and said non-driven body has a passageway therethrough, said passageways aligning with each other along said axis of rotation.

* * * * *